US009350910B2

(12) United States Patent
Hasegawa et al.

(10) Patent No.: US 9,350,910 B2
(45) Date of Patent: May 24, 2016

(54) OPERATION DEVICE, IMAGING DEVICE, AND REMOTE IMAGING SYSTEM

(71) Applicant: Olympus Corporation, Shibuya-ku, Tokyo (JP)

(72) Inventors: Yasuhiro Hasegawa, Hanno (JP); Shinya Kawasaki, Tokyo (JP); Akihiko Sakamoto, Yokohama (JP); Kiyoshi Toyoda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/227,551

(22) Filed: Mar. 27, 2014

(65) Prior Publication Data

US 2014/0313357 A1    Oct. 23, 2014

(30) Foreign Application Priority Data

Apr. 23, 2013    (JP) ................................ 2013-090348

(51) Int. Cl.
*H04N 5/232* (2006.01)

(52) U.S. Cl.
CPC .... *H04N 5/23203* (2013.01); *H04N 2201/0055* (2013.01); *H04N 2201/0084* (2013.01)

(58) Field of Classification Search
CPC ............. H04N 5/23203; H04N 5/232; H04N 5/23209; H04N 5/23296; H04N 2201/0084; H04N 2201/005; H04N 21/00; H04N 1/00307; H04N 2201/0055; H04N 2101/00
See application file for complete search history.

(56) References Cited

U.S. PATENT DOCUMENTS

| 2002/0191081 | A1* | 12/2002 | Ueyama | 348/207.1 |
|---|---|---|---|---|
| 2004/0165076 | A1* | 8/2004 | Nishimura et al. | 348/211.2 |
| 2004/0165077 | A1* | 8/2004 | Ohmori | 348/211.2 |
| 2006/0146140 | A1* | 7/2006 | Kennedy | 348/211.2 |
| 2012/0069206 | A1* | 3/2012 | Hsieh | 348/211.2 |
| 2013/0314608 | A1 | 11/2013 | Ito | |

FOREIGN PATENT DOCUMENTS

| JP | 2001-008190 | 1/2001 |
|---|---|---|
| JP | 2004-336475 | 11/2004 |
| JP | 2005-064906 | 3/2005 |

(Continued)

OTHER PUBLICATIONS

Office Action from corresponding Japanese Patent Application No. 2013-090348(5 pgs.), mailed Feb. 3, 2015, with translation (4 pgs.).

(Continued)

*Primary Examiner* — Luong T Nguyen
(74) *Attorney, Agent, or Firm* — John C. Pokotylo; Straub & Pokotylo

(57) ABSTRACT

An operation device includes an operation unit, a command generation unit configured to generate an operation command for an imaging device provided in the operation unit, a wireless communication unit configured to transmit the operation command to the imaging device, and receive image data transmitted from the imaging device, based on a QoS representing a priority of transmission/reception, and a QoS setting unit configured to set a QoS of a priority command to a value which is higher than a QoS of the image data when the operation command generated by the command generation unit is the priority command having a higher transmission priority than the image data received by the wireless communication unit.

15 Claims, 15 Drawing Sheets

(56) References Cited

FOREIGN PATENT DOCUMENTS

| | | | |
|---|---|---|---|
| JP | 2005-333520 | | 12/2005 |
| JP | 2006-008190 | | 1/2006 |
| JP | 2006-135710 | | 5/2006 |
| JP | B-4374253 | | 12/2009 |
| JP | 2010-117778 | * | 5/2010 |
| JP | 5122035 | | 1/2013 |
| JP | 2013-246814 | | 12/2013 |

OTHER PUBLICATIONS

IEEE 802.11-2012 specification, Table 9-1—UP to AC mappings, p. 820 (1 pg.).

Office Action to Japanese Patent Application No. JP2013/090348, mailed on Jul. 7, 2015 (3 pgs.) with translation (3 pgs.).

* cited by examiner

| PRIORITY | PURPOSE OF USE |
|---|---|
| 1 (HIGH) | Voice |
| 2 | Video |
| 3 | Best Effort |
| 4 (LOW) | Background |

OPERATION DEVICE, IMAGING DEVICE, AND REMOTE IMAGING SYSTEM

BACKGROUND OF THE INVENTION

1. Field of the Invention

The present invention relates to an operation device, an imaging device, and a remote imaging system.

Priority is claimed on Japanese Patent Application No. 2013-090348, filed Apr. 23, 2013, the content of which is incorporated herein by reference.

2. Description of Related Art

A remote control system which enables continuous imaging in an imaging device such as a digital camera to be executed in accordance with remote control from an operation device such as a personal computer (PC) connected by wire or a smartphone is known. For example, a remote control system which implements the continuous imaging by detecting the pressing and release of a switch provided on an operation device which is a different body from an imaging device and transmitting commands representing a continuous imaging start and a continuous imaging end from the operation device to the imaging device is known (for example, see Japanese Patent No. 4374253).

SUMMARY OF THE INVENTION

An operation device according to a first aspect of the present invention includes: an operation unit; a command generation unit configured to generate an operation command for an imaging device provided in the operation unit; a wireless communication unit configured to transmit the operation command to the imaging device, and receive an image data transmitted from the imaging device, based on a QoS (quality of service) representing a priority of transmission/reception; and a QoS setting unit configured to set a QoS of a priority command to a value which is higher than a QoS of the image data when the operation command generated by the command generation unit is the priority command having a higher transmission priority than the image data received by the wireless communication unit.

According to a second aspect of the present invention, the operation device according to the first aspect may further include a command determination unit configured to determine whether the operation command generated by the command generation unit is the priority command having the higher transmission priority than the image data received by the wireless communication unit.

According to a third aspect of the present invention, the operation device according to the first aspect may further include a monitoring unit configured to monitor a buffer state of data to be wirelessly communicated by the wireless communication unit. The QoS setting unit may determine whether to set the QoS of the priority command to a value which is higher than the QoS of the image data based on the buffer state monitored by the monitoring unit.

According to a fourth aspect of the present invention, in the operation device according to the third aspect, the monitoring unit may monitor whether the image data from the imaging device is being received based on the buffer state. The QoS setting unit may set the QoS of the priority command to a value which is higher than the QoS of the image data when a reception of the image data has not ended.

According to a fifth aspect of the present invention, in the operation device according to the fourth aspect, the QoS setting unit may set the QoS of the priority command to a value which is equal to or lower than the QoS of the image data when the reception of the image data has ended.

According to a sixth aspect of the present invention, in the operation device according to the third aspect, the monitoring unit may monitor whether a time in which the priority command is retained in a buffer is greater than or equal to a predetermined time. The QoS setting unit may set the QoS of the priority command to a value which is higher than the QoS of the image data when the time in which the priority command is retained in the buffer is greater than or equal to the predetermined time.

According to a seventh aspect of the present invention, the operation device according to the first aspect may further include a QoS check unit configured to check the QoS of the image data. The QoS setting unit may set the QoS of the priority command to a value which is higher than the QoS of the image data checked by the QoS check unit.

According to an eighth aspect of the present invention, the operation device according to the first aspect may further include a data storage unit configured to store a high QoS data defined in a protocol used by the wireless communication unit and the high QoS data has a higher QoS than the image data. The QoS setting unit may set the high QoS data corresponding to the priority command to a value. The wireless communication unit may transmit the high QoS data set by the QoS setting unit.

According to a ninth aspect of the present invention, in the operation device according to the eighth aspect, the high QoS data may be a voice data.

According to a tenth aspect of the present invention, in the operation device according to the eighth aspect, a data size of the high QoS data may be a size of data transmittable in one packet.

According to an eleventh aspect of the present invention, in the operation device according to the second aspect, the wireless communication unit may receive a QoS decrease instruction command representing an instruction to decrease the QoS of the priority command. The QoS setting unit may set the QoS of the priority command to a value which is lower than or equal to the QoS of the image data when the wireless communication unit has received the QoS decrease instruction command.

According to a twelfth aspect of the present invention, in the operation device according to the eleventh aspect, the wireless communication unit may receive a QoS decrease cancelation instruction command representing an instruction to cancel the QoS decrease instruction. The QoS setting unit may set the QoS of the priority command to a value which is higher than the QoS of the image data when the wireless communication unit has received the QoS decrease cancelation instruction command.

An imaging device according to a thirteenth aspect of the present invention includes an imaging unit configured to generate an image data; and a wireless communication unit configured to transmit the image data to an operation device, and receive an operation command transmitted from the operation device, based on a QoS representing a priority of transmission/reception.

A remote imaging system according to a fourteenth aspect of the present invention includes an imaging device and an operation device configured to remotely operate the imaging device using wireless communication. The operation device includes: an operation unit; a command generation unit configured in the operation unit to generate an operation command for the imaging device; a first wireless communication unit configured to transmit the operation command to the imaging device, and receive an image data transmitted from the imaging device, based on a QoS representing a priority of transmission/reception; and a QoS setting unit configured to set a QoS of a priority command to a value which is higher than a QoS of the image data when the operation command generated by the command generation unit is the priority command having a higher transmission priority than the image data received by the first wireless communication unit. The imaging device includes: an imaging unit configured to generate the image data; and a second wireless communication unit configured to transmit the image data to the operation device, and receive the operation command transmitted from the operation device, based on the QoS representing the priority of transmission/reception.

According to a fifteenth aspect of the present invention, in the remote imaging system according to the fourteenth aspect, the imaging device may further include: a QoS change instruction command generation unit configured to generate a QoS decrease instruction command representing an instruction to decrease the QoS of the priority command predetermined with the imaging device which transmits the image data. The operation device may further include: a QoS change instruction command analysis unit configured to receive the QoS decrease instruction command from the imaging device and acquire a QoS decrease instruction. The QoS setting unit may set the QoS of the priority command to a value which is equal to or lower than the QoS of the image data when the QoS change instruction command analysis unit has acquired the QoS decrease instruction.

According to a sixteenth aspect of the present invention, in the remote imaging system according to the fifteenth aspect, the QoS change instruction command generation unit may generate a QoS instruction cancelation command representing an instruction to cancel the instruction to decease the QoS of the priority command predetermined with the imaging device which transmits the image data. The QoS change instruction command analysis unit may receive the QoS instruction cancelation command from the imaging device and acquire a QoS instruction cancelation instruction. The QoS setting unit may set the QoS of the priority command to a value which is higher than the QoS of the image data when the QoS change instruction command analysis unit has acquired the QoS instruction cancelation instruction.

A remote imaging method according to a seventeenth aspect of the present invention includes a command generation step of generating an operation command for an imaging device provided in an operation unit; a wireless communication step of transmitting the operation command to the imaging device, and receiving an image data transmitted from the imaging device, based on a QoS representing a priority of transmission/reception; and a QoS setting step of setting a QoS of a priority command to a value which is higher than the QoS of the image data when the operation command generated in the command generation step is the priority command having a higher transmission priority than the image data received in the wireless communication step.

According to an eighteenth aspect of the present invention, a computer program product storing a program to be executed by a computer causes a computer to perform: a command generation step of generating an operation command for an imaging device provided in an operation unit; a wireless communication step of transmitting the operation command to the imaging device, and receiving an image data transmitted from the imaging device, based on a QoS representing a priority of transmission/reception; and a QoS setting step of setting a QoS of a priority command to a value which is higher than the QoS of the image data when the operation command generated in the command generation step is the priority command having a higher transmission priority than the image data received in the wireless communication step.

DETAILED DESCRIPTION OF THE INVENTION (First Embodiment)

Figure 1:
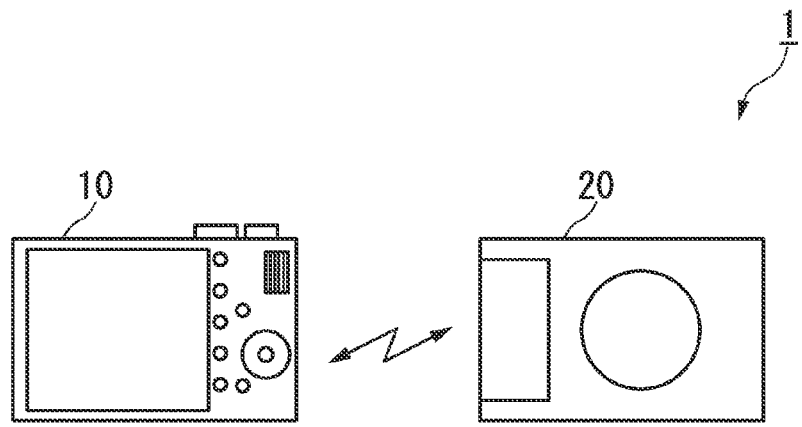
FIG. 1 is a schematic diagram illustrating a configuration of a remote imaging system according to a first embodiment of the present invention.

Hereinafter, the first embodiment of the present invention will be described with reference to the drawings. FIG. 1 is a schematic diagram illustrating a configuration of a remote imaging system in this embodiment. In the illustrated example according to the FIG. 1, the remote imaging system 1 includes an operation device 10 and an imaging device 20.

The operation device 10 wirelessly controls the imaging device 20 from a remote place to operate the imaging device 20 or display and save an image of the imaging device 20. The imaging device 20 transmits an image captured to the operation device 10, according to an instruction from the operation device 10.

Although an example in which the operation device 10 and the imaging device 20 perform wireless communication one-to-one will be described in this embodiment, the present invention is also applicable to a relationship of any one of 1-to-N, M-to-1, and M-to-N (N and M are natural numbers).

Figure 2:
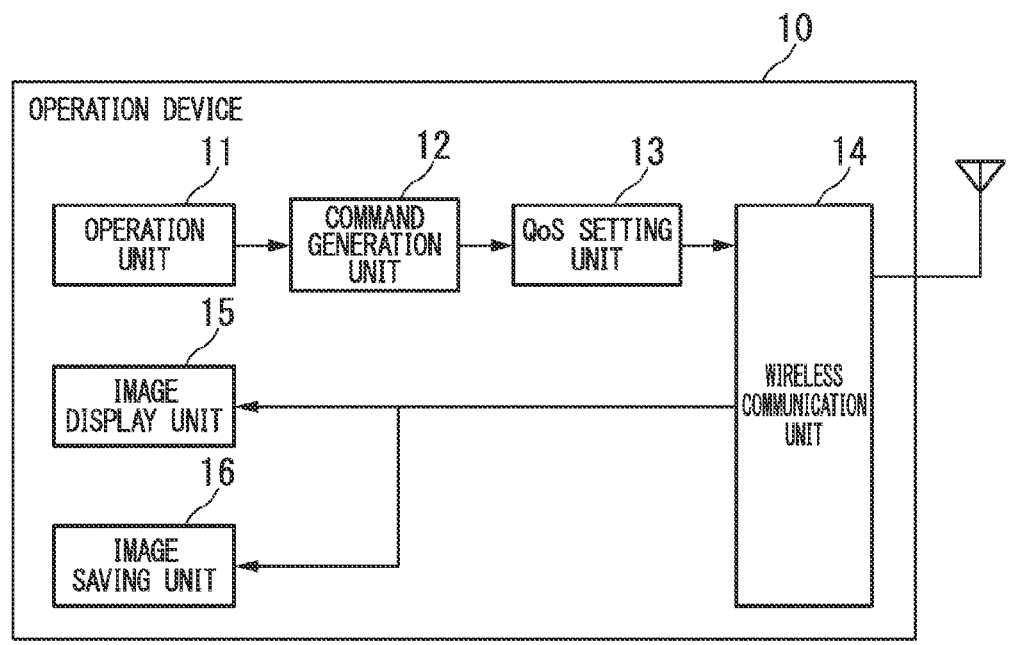
FIG. 2 is a block diagram illustrating a configuration of an operation device according to the first embodiment of the present invention.

Next, a configuration of the operation device 10 will be described. FIG. 2 is a block diagram illustrating the configuration of the operation device 10 according to this embodiment. In the illustrated example according to the FIG. 2, the operation device 10 includes an operation unit 11, a command generation unit 12, a QoS setting unit 13, a wireless communication unit 14 (first wireless communication unit), an image display unit 15, and an image saving unit 16.

The operation unit 11 includes various types of operation keys, buttons, a touch panel, etc. The operation unit 11 receives an input of an operation for the imaging device 20. The operation unit 11 outputs operation information representing the operation in which the input has been received to the command generation unit 12. The command generation unit 12 generates an operation command to be transmitted to the imaging device 20 from the operation information input from the operation unit 11. The command generation unit 12 outputs the generated operation command to the QoS setting unit 13.

The QoS setting unit 13 treats the operation command input from the command generation unit 12 as a priority command. The QoS setting unit 13 sets the QoS to a value higher than the QoS of image data to be described later for the priority command. In addition, the QoS setting unit 13 outputs the priority command for which the QoS has been set to the wireless communication unit 14.

The wireless communication unit 14 transmits the priority command input from the QoS setting unit 13 to the imaging device 20 via an antenna according to the QoS set by the QoS setting unit 13. In addition, the wireless communication unit 14 outputs the image data received from the imaging device 20 to the image display unit 15 and the image saving unit 16 via the antenna. The image display unit 15 is a liquid crystal display (LCD) or the like, and displays image data input from the wireless communication unit 14. The image saving unit 16 is a memory device or the like and saves the image data input from the wireless communication unit 14.

Figure 3:
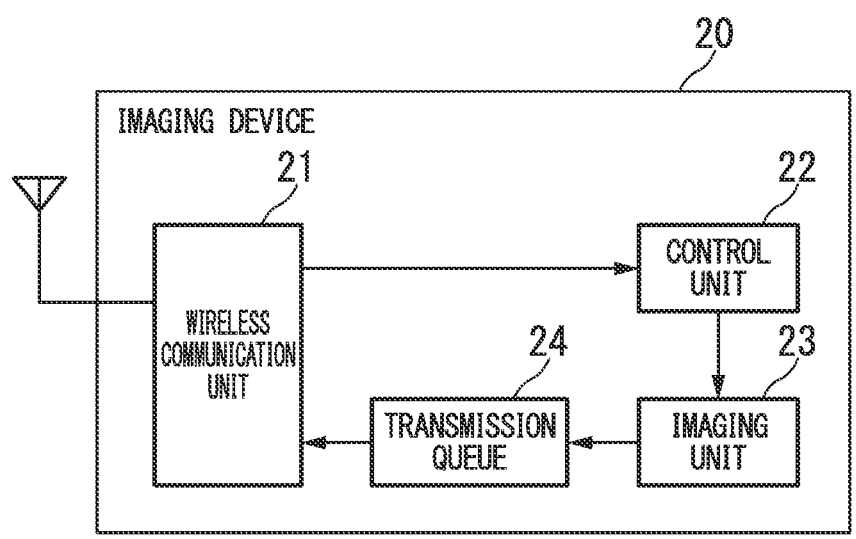
FIG. 3 is a block diagram illustrating an imaging device according to the first embodiment of the present invention.

Next, a configuration of the imaging device 20 will be described. FIG. 3 is a block diagram illustrating the configuration of the imaging device 20 according to this embodiment. In the illustrated example according to the FIG. 3, the imaging device 20 includes a wireless communication unit 21 (second wireless communication unit), a control unit 22, an imaging unit 23, and a transmission queue 24. The wireless communication unit 21 wirelessly receives the operation command transmitted from the operation device 10 via an antenna, and outputs the received operation command to the control unit 22. In addition, image data output by the imaging unit 23 is wirelessly transmitted to the operation device 10 via the antenna.

The control unit 22 generates operation information from the operation command input from the wireless communication unit 21, and outputs the generated operation information to the imaging unit 23. The imaging unit 23 includes a lens, an imaging element such as a charge-coupled device (CCD) configured to convert light collected by the lens into an electrical signal, and its peripheral circuit. The imaging unit 23 performs imaging according to the operation information input from the control unit 22, performs conversion into image data, and outputs the image data to the transmission queue 24. The transmission queue 24 temporarily saves the image data input from the imaging unit 23, and outputs the image data to the wireless communication unit 21 according to an instruction of the wireless communication unit 21.

According to this configuration, the imaging device 20 can perform the imaging according to the operation command transmitted from the operation device 10 and transmit the image data generated by the imaging to the operation device 10. In addition, the operation device 10 can control an imaging operation of the imaging device 20 by transmitting the operation command, and receive the image data transmitted from the imaging device 20.

Figure 4:
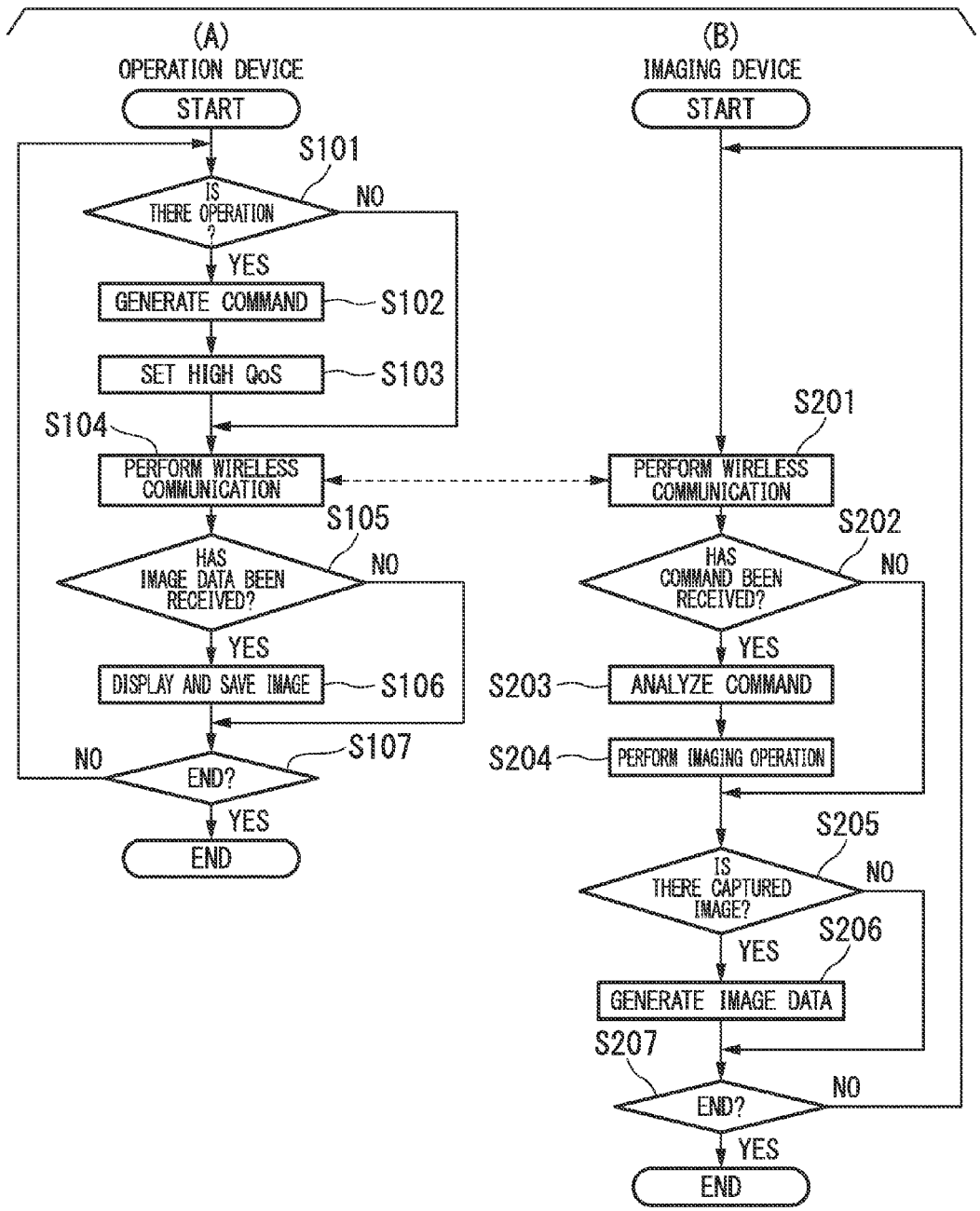
FIG. 4 is a flowchart illustrating operation procedures of the operation device and the imaging device according to the first embodiment of the present invention.

Next, operation procedures of the operation device 10 and the imaging device 20 will be described. FIG. 4 is a flowchart illustrating the operation procedures of the operation device 10 and the imaging device 20 according to this embodiment. First, the operation procedure of the operation device 10 will be described. In FIG. 4, (A) is a flowchart illustrating the operation procedure of the operation device 10.

(Step S101) The operation unit 11 executes an operation determination step. In the operation determination step, the operation unit 11 monitors various types of operation keys, buttons, a touch panel, and so on, and determines whether an input of an operation has been received. Upon determining that the input of the operation has been received, the operation unit 11 outputs operation information representing the operation in which the input has been received to the command generation unit 12. The process proceeds to step S102. In addition, when the operation unit 11 determines that the input of the operation has not been received, the process proceeds to step S105.

(Step S102) The command generation unit 12 executes a command generation step. In the command generation step, the command generation unit 12 generates an operation command to be transmitted to the imaging device 20 from the operation information input in step S101. Thereafter, the process proceeds to step S103.

(Step S103) The QoS setting unit 13 executes a priority command setting step. In the priority command setting step, the QoS setting unit 13 treats all operation commands generated by the command generation unit 12 in the process of step S102 as priority commands. The QoS setting unit 13 sets higher QoS than the QoS of image data for the priority command (operation command), and outputs the priority command to the wireless communication unit 14. Thereafter, the process proceeds to step S104.

(Step S104) The wireless communication unit 14 executes a wireless communication step. In the wireless communication step, the wireless communication unit 14 performs a transmission process of the priority command for the imaging device 20 or a reception process of the image data transmitted from the imaging device 20 based on the QoS set in the priority command. Thereafter, the process proceeds to step S105. According to this embodiment, because the operation commands are all treated as the priority commands, the QoS of the operation command (priority command) generated in the process of step S102 is higher than the QoS of the image data. Accordingly, the wireless communication unit 14 transmits the priority command when the priority command has been input. When the priority command has not been input, the wireless communication unit 14 performs the reception process of the image data. In addition, when there is no priority command which is transmitted and there is no image data which is received, the process proceeds to step S105.

(Step S105) The wireless communication unit 14 executes an image data reception determination step. In the image data reception determination step, the wireless communication unit 14 determines whether image data has been received from the imaging device 20 in the process of step S104. When the wireless communication unit 14 determines that the image data has been received, the process proceeds to step S106. Otherwise, the process proceeds to step S107.

(Step S106) The image display unit 15 and the image saving unit 16 execute image display and saving steps. In the image display and saving steps, the image display unit 15 displays the image data received in the process of step S104 on an LCD or the like and the image saving unit 16 saves the image data received in the process of step S104 in a memory device or the like. Thereafter, the process proceeds to step S107.

(Step S107) The operation unit 11 executes an end determination step. In the end determination step, the operation unit 11 determines whether an input of a switch operation such as power-supply OFF has been received. When the operation unit 11 determines that the input of the switch operation such as the power-supply OFF has been received, the process ends. Otherwise, the process returns to step S101.

Next, the operation procedure of the imaging device 20 will be described. FIG. 4B is a flowchart illustrating the operation procedure of the imaging device 20.

(Step S201) The wireless communication unit 21 executes a wireless communication step. In the wireless communication step, the wireless communication unit 21 performs a reception process of a priority command transmitted from the imaging device 20 or a transmission process of image data for the operation device 10 based on QoS set in the priority command. Thereafter, the process proceeds to step S202. According to this embodiment, the reception process of the priority command is performed when the priority command has been transmitted from the operation device 10 because operation commands are all treated as priority commands. In this embodiment, the transmission process of the image data saved in the transmission queue 24 is performed when the priority command has not been transmitted from the operation device 10. In addition, when there is no priority command which is received and there is no image data which is transmitted, the process proceeds to step S202.

(Step S202) The wireless communication unit 21 executes a command reception determination step. In the command reception determination step, the wireless communication unit 21 determines whether the priority command has been received from the operation device 10. When the wireless communication unit 21 determines that the priority command has been received, the process proceeds to step S203. Otherwise, the process proceeds to step S205.

(Step S203) The control unit 22 executes a command analysis step. In the command analysis step, the control unit 22 acquires operation information by analyzing the priority command received in the process of step S201. The control unit 22 outputs the acquired operation information to the imaging unit 23. Thereafter, the process proceeds to step S204.

(Step S204) The imaging unit 23 executes an operation step. In the operation step, the imaging unit 23 performs an imaging operation according to the operation information acquired in the process of step S203. Thereafter, the process proceeds to step S205. For example, when an acquired operation instruction is a shutter instruction, imaging is performed and image data is generated. In addition, for example, when the acquired operation instruction is an auto focus instruction, the imaging unit 23 performs a focus operation at coordinates representing a focal position of auto focus.

(Step S205) The imaging unit 23 executes an image determination step. In the image determination step, the imaging unit 23 determines whether image data has been generated in the process of step S204. When the imaging unit 23 determines that the image data has been generated, the process proceeds to step S206. Otherwise, the process proceeds to step S207.

(Step S206) The imaging unit 23 executes an image data generation step. In the image data generation step, the imaging unit 23 sets QoS in the image data generated in the process of step S204. The imaging unit 23 outputs the image data for which the QoS has been set to the transmission queue 24. The transmission queue 24 temporarily stores the input image data. Thereafter, the process proceeds to step S207.

(Step S207) The control unit 22 executes an end determination step. In the end determination step, the control unit 22 determines whether an input of a switch operation such as power-supply OFF (not illustrated) has been received. When the control unit 22 determines that the input of the switch operation such as the power-supply OFF has been received, the process ends. Otherwise, the process returns to step S201.

Figures 5, 6:
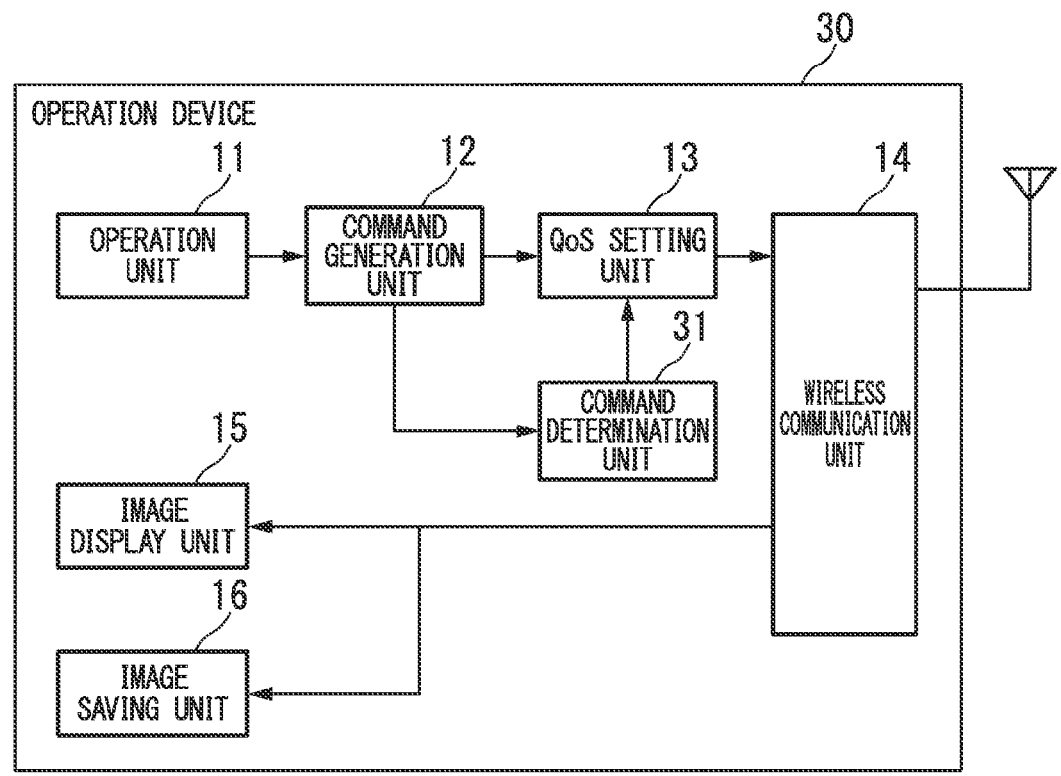
FIG. 5 is a schematic diagram illustrating QoS according to the first embodiment of the present invention.
FIG. 6 is a block diagram illustrating a configuration of an operation device according to a second embodiment of the present invention.

Next, the QoS will be described. FIG. 5 is a schematic diagram illustrating the QoS in this embodiment. In the illustrated example according to the FIG. 5, an access category defined in Institute of Electrical and Electronics Engineers (IEEE) 802.11e in relation to the QoS is shown. Transmission data is classified into four types of access categories, that is, four types for every type of transmission data, and priority control is implemented by attaching a difference to QoS provided for every category.

In the access category, priorities 1 to 4 are set. In the access category, the priority 1 is the highest priority and the priority is lower when the number is larger. That is, the priority 4 is the lowest priority. In the illustrated example according to the FIG. 5, the priority 1 is used to transmit voice data. The priority 2 is used to transmit video data. The priority 3 is used to transmit best effort data. The priority 4 is used to transmit background data.

As described above, according to this embodiment, the operation device 10 can set higher QoS than the QoS of image data for the priority command, and transmit the priority command to the imaging device 20. Accordingly, even when the imaging device 20 has image data to be transmitted to the operation device 10, the operation device 10 can preferentially transmit the priority command to the imaging device 20. Thereby, it is possible to perform continuous imaging at a high speed even when the command is transmitted from the operation device 10 to the imaging device 20 using wireless communication.

(Second Embodiment)

Next, a second embodiment of the present invention will be described with reference to the drawings. A remote imaging system in this embodiment includes a wireless sensing terminal and a data collection terminal as in the first embodiment. A difference between this embodiment and the first embodiment is the configuration of an operation device. The configuration of an imaging device in this embodiment is similar to that of the imaging device 20 in the first embodiment.

FIG. 6 is a block diagram illustrating the configuration of the operation device 30 according to this embodiment. In the illustrated example according to the FIG. 6, the operation device 30 includes an operation unit 11, a command generation unit 12, a QoS setting unit 13, a wireless communication unit 14, an image display unit 15, an image saving unit 16, and a command determination unit 31. The operation unit 11, the command generation unit 12, the QoS setting unit 13, the wireless communication unit 14, the image display unit 15, and the image saving unit 16 are similar to the respective units according to the first embodiment.

The command determination unit 31 determines whether the operation command generated by the command generation unit 12 is a priority command to be preferentially transmitted to the imaging device 20, and outputs a determination result to the QoS setting unit 13. An operation command including a shutter instruction for instructing to perform imaging, an operation command including an auto focus instruction, an operation command including coordinate information representing a focal position of the auto focus, and an operation command including an electric zoom instruction may serve as an operation command which is determined to be the priority command by the command determination unit 31, and some or all thereof may be targeted.

The QoS setting unit 13 treats the operation command which is determined to be the priority command by the command determination unit 31 as the priority command among operation commands input from the command generation unit 12, and treats other operation commands as normal operation commands. The QoS setting unit 13 sets the QoS to a value which is higher than the QoS of the image data for the priority command. The QoS setting unit 13 sets the QoS to a value which is equal to or lower than the QoS of the image data for a normal operation command. In addition, the QoS setting unit 13 outputs the priority command or the normal operation command whose QoS value has been set to the wireless communication unit 14.

Figure 7:
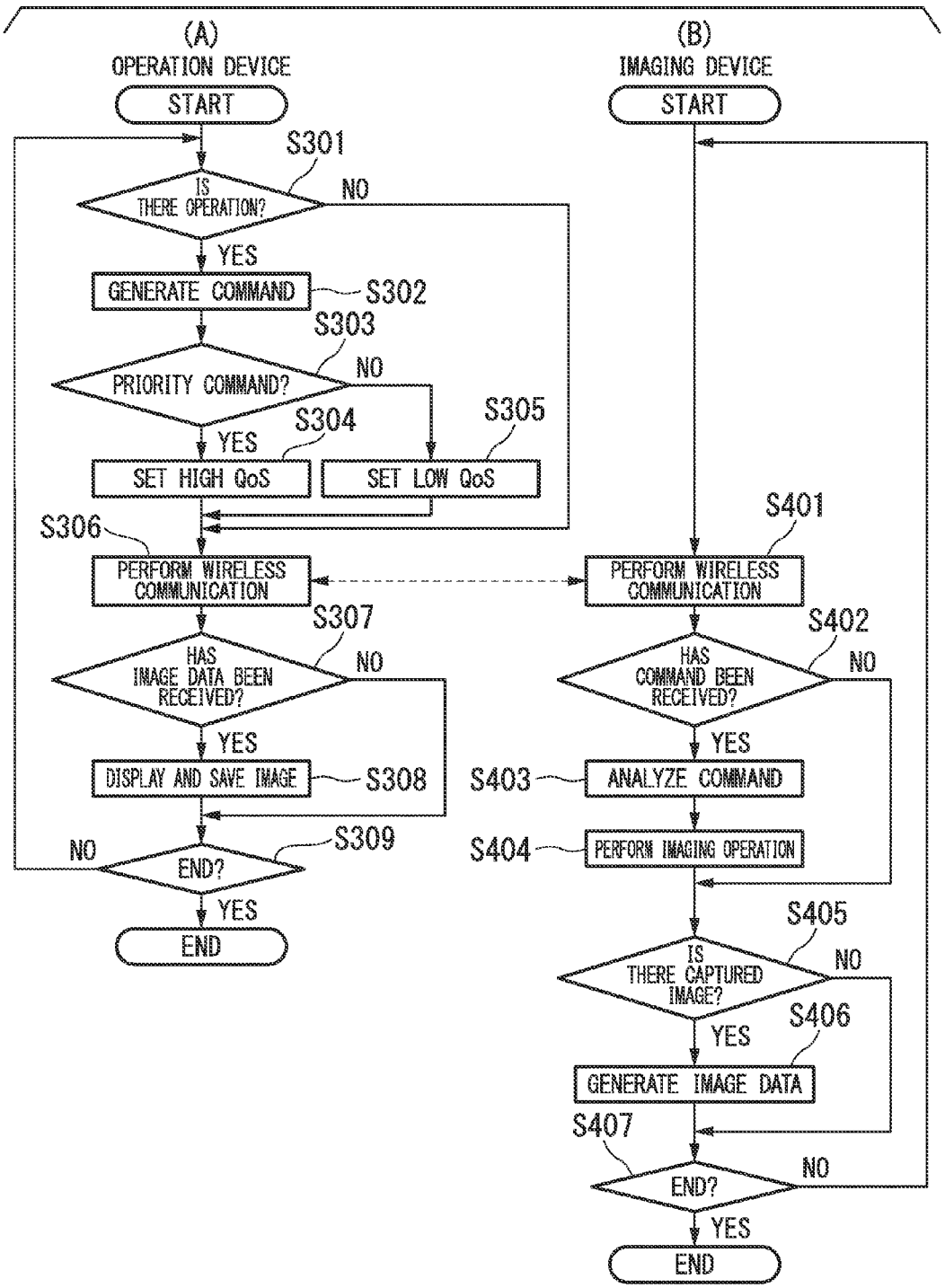
FIG. 7 is a flowchart illustrating operation procedures according to the operation device and an imaging device of the second embodiment of the present invention.

Next, operation procedures of the operation device 30 and the imaging device 20 will be described. FIG. 7 is a flowchart illustrating the operation procedures of the operation device 30 and the imaging device 20 in this embodiment. First, the operation procedure of the operation device 30 will be described. In FIG. 7, (A) is a flowchart illustrating the operation procedure of the operation device 30. The process of steps S301 and S302 is similar to the process of steps S101 and S102 of the first embodiment.

(Step S303) The command determination unit 31 executes a priority command determination step. In the priority command determination step, the command determination unit 31 determines whether the operation command generated by the command generation unit 12 in the process of step S302 is the priority command. When the command determination unit 31 determines that the operation command generated by the command generation unit 12 is the priority command, the process proceeds to step S304. Otherwise, the process proceeds to step S305.

(Step S304) The QoS setting unit 13 executes a priority command setting step. In the priority command setting step, the QoS setting unit 13 treats the operation command which is determined to be the priority command by the command determination unit 31 in the process of step S303 as the priority command. The QoS setting unit 13 sets the QoS to a value which is higher than the QoS of the image data for the priority command (operation command), and outputs the priority command to the wireless communication unit 14. Thereafter, the process proceeds to step S306.

(Step S305) The QoS setting unit 13 executes a normal command setting step. In the normal command setting step, the QoS setting unit 13 treats an operation command which is determined to be the normal command by the command determination unit 31 in the process of step S303 as the normal command. The QoS setting unit 13 sets the QoS to a value which is equal to or lower than the QoS of image data for the normal command (operation command), and outputs the normal command to the wireless communication unit 14. Thereafter, the operation device 30 proceeds to the process of step S306.

(Step S306) The wireless communication unit 14 executes a wireless communication step. In the wireless communication step, the wireless communication unit 14 performs a transmission process of the priority command or the normal command for the imaging device 20 or a reception process of image data transmitted from the imaging device 20 based on the QoS set in the priority command or the normal command. Thereafter, the process proceeds to step S105. In this embodiment, QoS of the priority command is higher than the QoS of the image data. Accordingly, the wireless communication unit 14 transmits the priority command when the priority command has been input. When the priority command has not been input, the image data reception process is performed. In addition, the QoS of the normal command is equal to or lower than the QoS of the image data. Accordingly, when the normal command has been input, the wireless communication unit 14 performs the normal command transmission process after the image data reception process has ended. In addition, when there is no priority command or normal command which is transmitted and there is no image data which is received, the process proceeds to step S307.

The process of steps S307 to S309 is similar to the process of steps S105 to S107 in the first embodiment.

Next, the operation procedure of the imaging device 20 will be described. In FIG. 7, (B) is a flowchart illustrating the operation procedure of the imaging device 20.

(Step S401) The wireless communication unit 21 executes a wireless communication step. In the wireless communication step, the wireless communication unit 21 performs the reception process of the priority command or the normal command transmitted from the operation device 30 or the transmission process of the image data for the operation device 30 based on QoS set in the priority command or the normal command. Thereafter, the process proceeds to step S402. In this embodiment, the priority command reception process is performed when the priority command has been transmitted from the operation device 30. In this embodiment, the transmission process of the image data saved in the queue 24 is performed when the priority command has not been transmitted from the operation device 30.

The process of steps S402 to S407 is similar to the process of steps S202 to S207 in the first embodiment.

As described above, according to this embodiment, the command determination unit 31 of the operation device 30 determines whether the operation command is the priority command or the normal command. The QoS setting unit 13 of the operation device 30 sets the QoS to a value higher than the QoS of image data for the priority command, sets the QoS to a value which is equal to or lower than the QoS of the image data for the normal command, and transmits each command to the imaging device 20. Accordingly, even when the imaging device 20 has the image data to be transmitted to the operation device 30, the operation device 30 can preferentially transmit the priority command to the imaging device 20. In addition, the operation device 30 can transmit the normal command to the imaging device 20 at a priority which is equal to or lower than the QoS of the image data. Thereby, even when the command is transmitted from the operation device 30 to the imaging device 20 using wireless communication, it is possible to perform continuous imaging at high speed.

(Third Embodiment)

Next, the third embodiment of the present invention will be described with reference to the drawings. A remote imaging system in this embodiment includes a wireless sensing device and a data collection device as in the second embodiment. A difference between this embodiment and the second embodiment is a configuration of an operation device. The configuration of an imaging device of this embodiment is similar to that of the imaging device 20 in the second embodiment.

Figure 8:
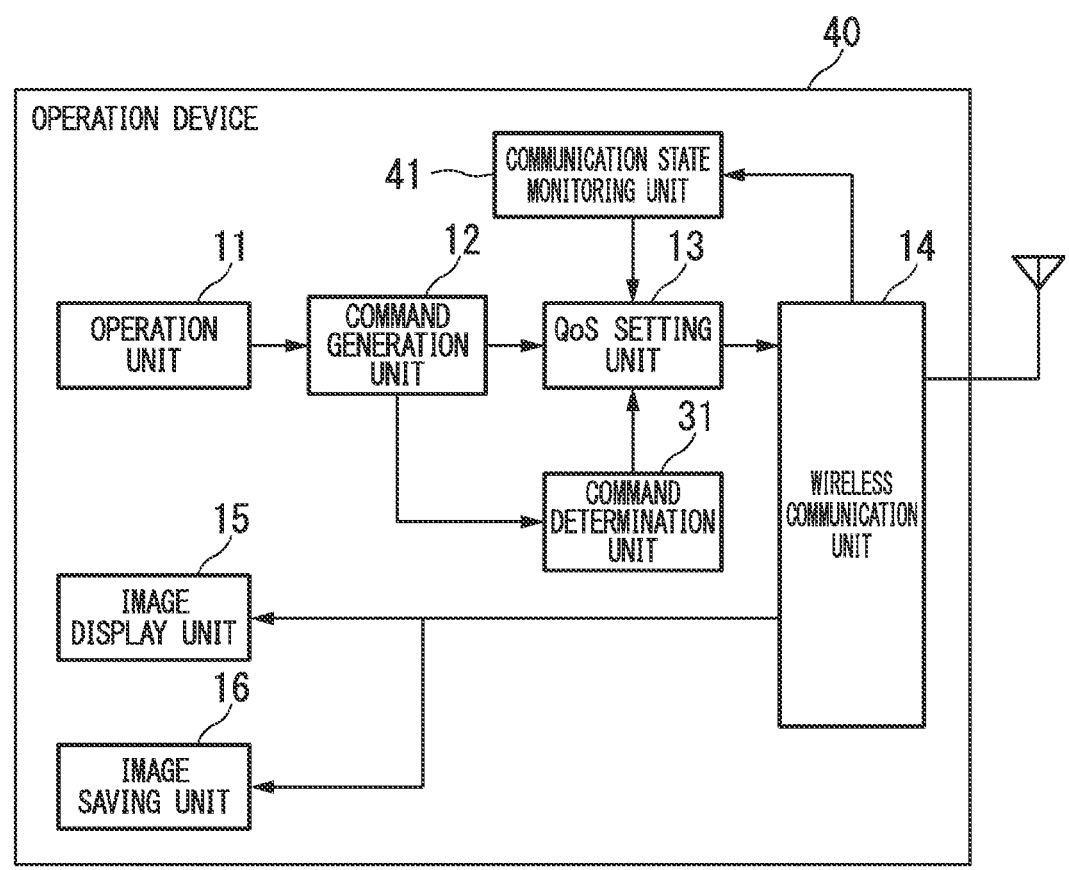
FIG. 8 is a block diagram illustrating a configuration of an operation device according to a third embodiment of the present invention.

FIG. 8 is a block diagram illustrating a configuration of the operation device 40 in this embodiment. In the illustrated example according to the FIG. 8, the operation device 40 includes an operation unit 11, a command generation unit 12, a QoS setting unit 13, a wireless communication unit 14, an image display unit 15, an image saving unit 16, a command determination unit 31, and a communication state monitoring unit 41. The operation unit 11, the command generation unit 12, the QoS setting unit 13, the wireless communication unit 14, the image display unit 15, the image saving unit 16, and the command determination unit 31 are similar to the respective units of the second embodiment.

The communication state monitoring unit 41 monitors whether the wireless communication unit 14 is in a state in which image data is being received from the imaging device 20, and outputs information representing a communication state to the QoS setting unit 13. When the input information representing the communication state is information representing that communication is not in progress, the QoS setting unit 13 sets QoS to a value which is equal to or lower than the QoS of the image data for all commands regardless of whether they are priority commands and outputs the commands to the wireless communication unit 14. On the other hand, when the input information representing the communication state is information indicating that the communication is in progress, the QoS setting unit 13 performs a process similar to that of the second embodiment.

Figure 9:
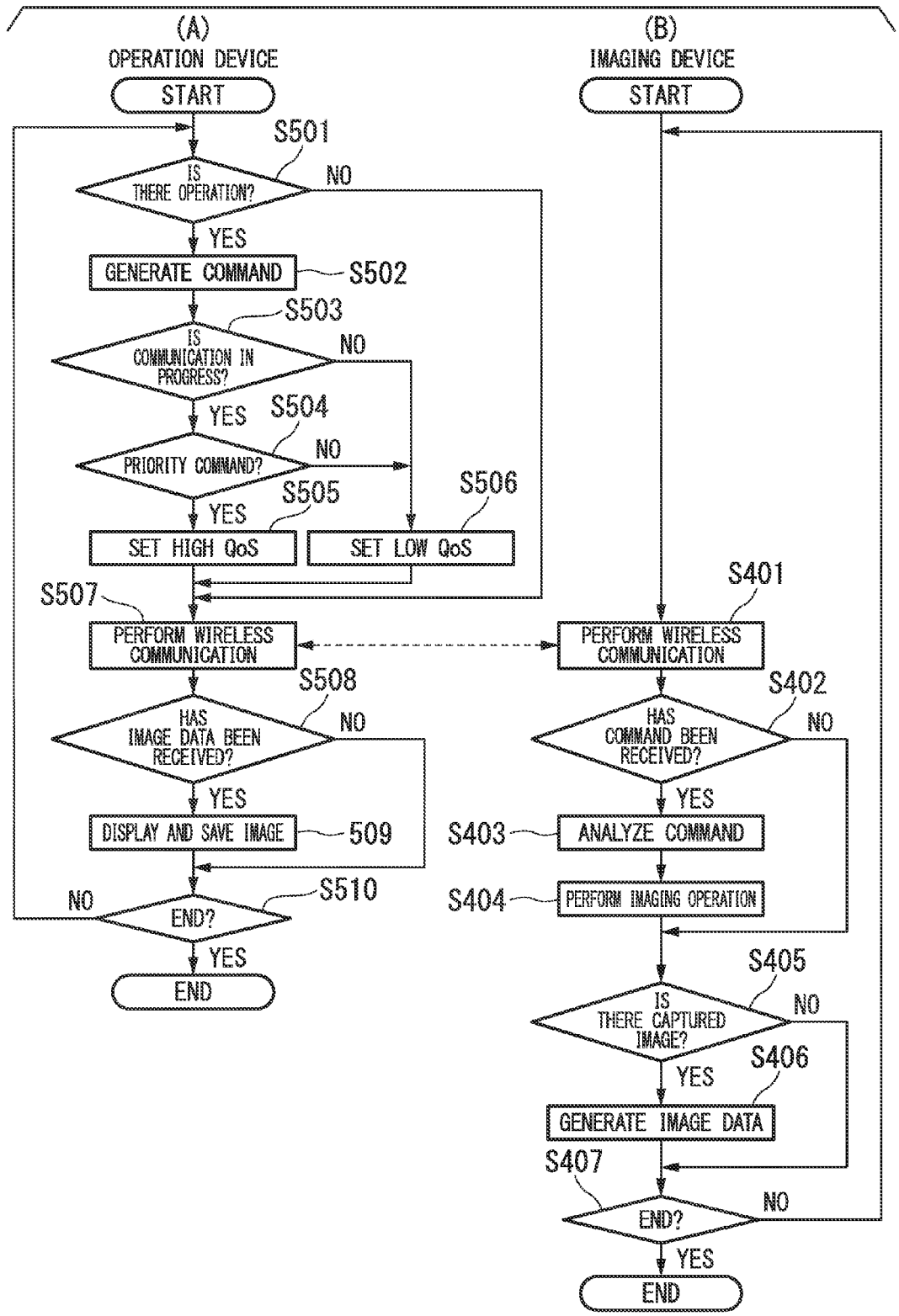
FIG. 9 is a flowchart illustrating operation procedures of the operation device and an imaging device according to the third embodiment of the present invention.

Next, operation procedures of the operation device 40 and the imaging device 20 will be described. FIG. 9 is a flowchart illustrating the operation procedures of the operation device 40 and the imaging device 20 in this embodiment. First, the operation procedure of the operation device 40 will be described. In FIG. 9, (A) is a flowchart illustrating the operation procedure of the operation device 40. The process of steps S501 and S502 is similar to the process of steps S301 and S302 in the second embodiment.

(Step S503) The communication state monitoring unit 41 executes a communication state determination step. In the communication state determination step, the communication state monitoring unit 41 determines whether the wireless communication unit 14 is communicating to receive image data from the imaging device 20. When the communication state monitoring unit 41 determines that communication is in progress, the process proceeds to step S506. Otherwise, the process proceeds to step S505.

The process of steps S504 to S510 is similar to the process of steps S303 to S309 of the second embodiment.

Next, the operation procedure of the imaging device 20 will be described. In FIG. 9, (B) is a flowchart illustrating the operation procedure of the imaging device 20. The operation procedure of the imaging device 20 in this embodiment is similar to the operation procedure of the imaging device 20 in the second embodiment.

As described above, according to this embodiment, the communication state monitoring unit 41 of the operation device 40 determines whether the wireless communication unit 14 is receiving image data (communicating). Then, when the wireless communication unit 14 is not receiving the image data (not communicating), the QoS setting unit 13 of the operation device 40 sets the QoS to a value which is equal to or lower than the QoS of the image data for all commands regardless of whether they are priority commands, and outputs the commands to the wireless communication unit 14. On the other hand, when the wireless communication unit 14 is receiving the image data (communicating), the QoS setting unit 13 sets the QoS to a value which is higher than the QoS of image data for the priority command, sets the QoS to a value which is equal to or lower than the QoS of the image data for the normal command, and transmits each command to the imaging device 20.

Because it is not necessary to set a higher priority than the QoS of image data for a priority command when the image data is not being received, the operation device 40 sets QoS to a value which is equal to or lower than the QoS of the image data for all commands. In addition, when the image data is being received, the operation device 40 sets the QoS to a value which is higher than the QoS of the image data for the priority command. Therefore, when the operation device 40 transmits the command to the imaging device 20 using wireless communication, it is possible to perform continuous imaging at a high speed even when the image data is being received.

(Fourth Embodiment)

Next, the fourth embodiment of the present invention will be described with reference to the drawings. A remote imaging system in this embodiment includes a wireless sensing device and a data collection device as in the second embodiment. A difference between this embodiment and the second embodiment is the configuration of an operation device. A configuration of an imaging device in this embodiment is similar to the configuration of the imaging device 20 in the second embodiment.

Figure 10:
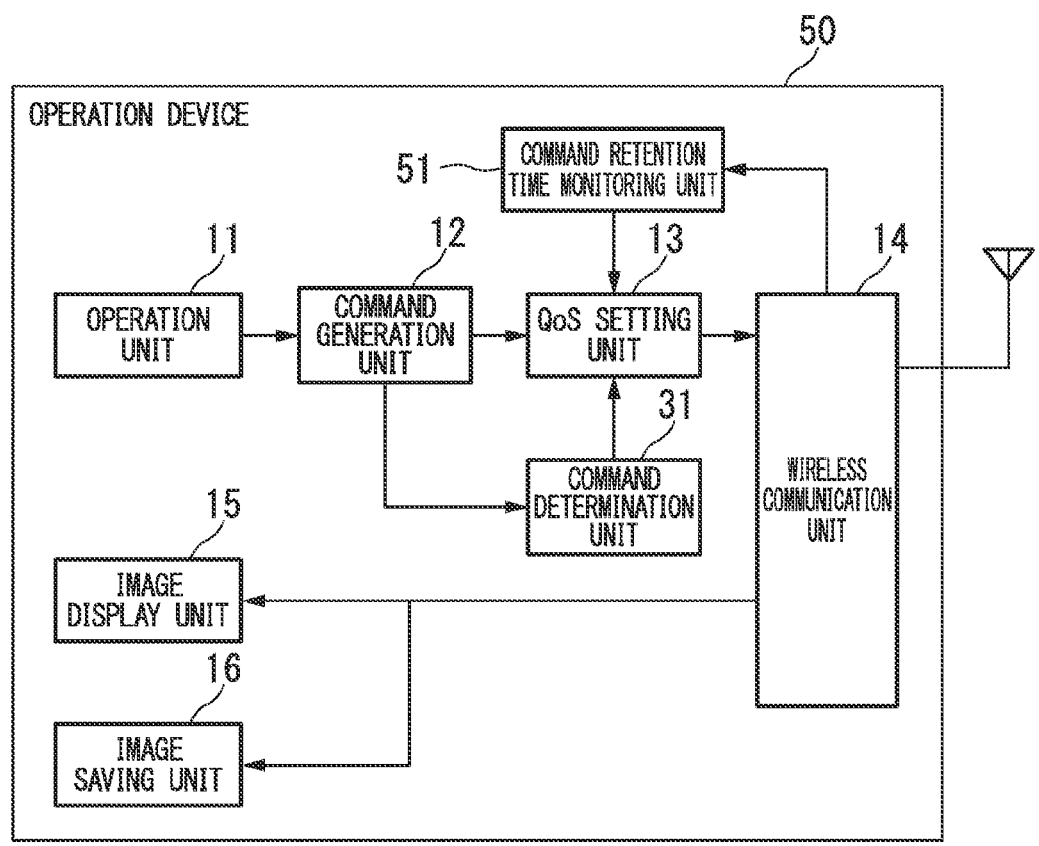
FIG. 10 is a block diagram illustrating a configuration of an operation device according to a fourth embodiment of the present invention.

FIG. 10 is a block diagram illustrating the configuration of the operation device 50 in this embodiment. In the illustrated example according to the FIG. 10, the operation device 50 includes an operation unit 11, a command generation unit 12, a QoS setting unit 13, a wireless communication unit 14, an image display unit 15, an image saving unit 16, a command determination unit 31, and a command retention time monitoring unit 51. The operation unit 11, the command generation unit 12, the QoS setting unit 13, the wireless communication unit 14, the image display unit 15, the image saving unit 16, and the command determination unit 31 are similar to the respective units in the second embodiment.

The command retention time monitoring unit 51 measures a time (retention time) from when the QoS setting unit 13 outputs the priority command to the wireless communication unit 14 to when the priority command is transmitted to the imaging device 20. The command retention time monitoring unit 51 determines whether the retention time has exceeded a predetermined time (a threshold value of the command retention time). Upon determining that the retention time of the priority command has exceeded the predetermined time, the command retention time monitoring unit 51 outputs retention time-out information to the QoS setting unit 13. The above-described predetermined time may be arbitrarily set.

The QoS setting unit 13 originally sets the QoS to a value which is equal to or lower than the QoS of the image data for all commands regardless of whether they are priority commands, and outputs the commands to the wireless communication unit 14. On the other hand, when the retention time-out information has been input from the command retention time monitoring unit 51, the QoS setting unit 13 sets the QoS to a value which is higher than the QoS of the image data for a priority command having a retention time exceeding the predetermined time.

Figure 11:
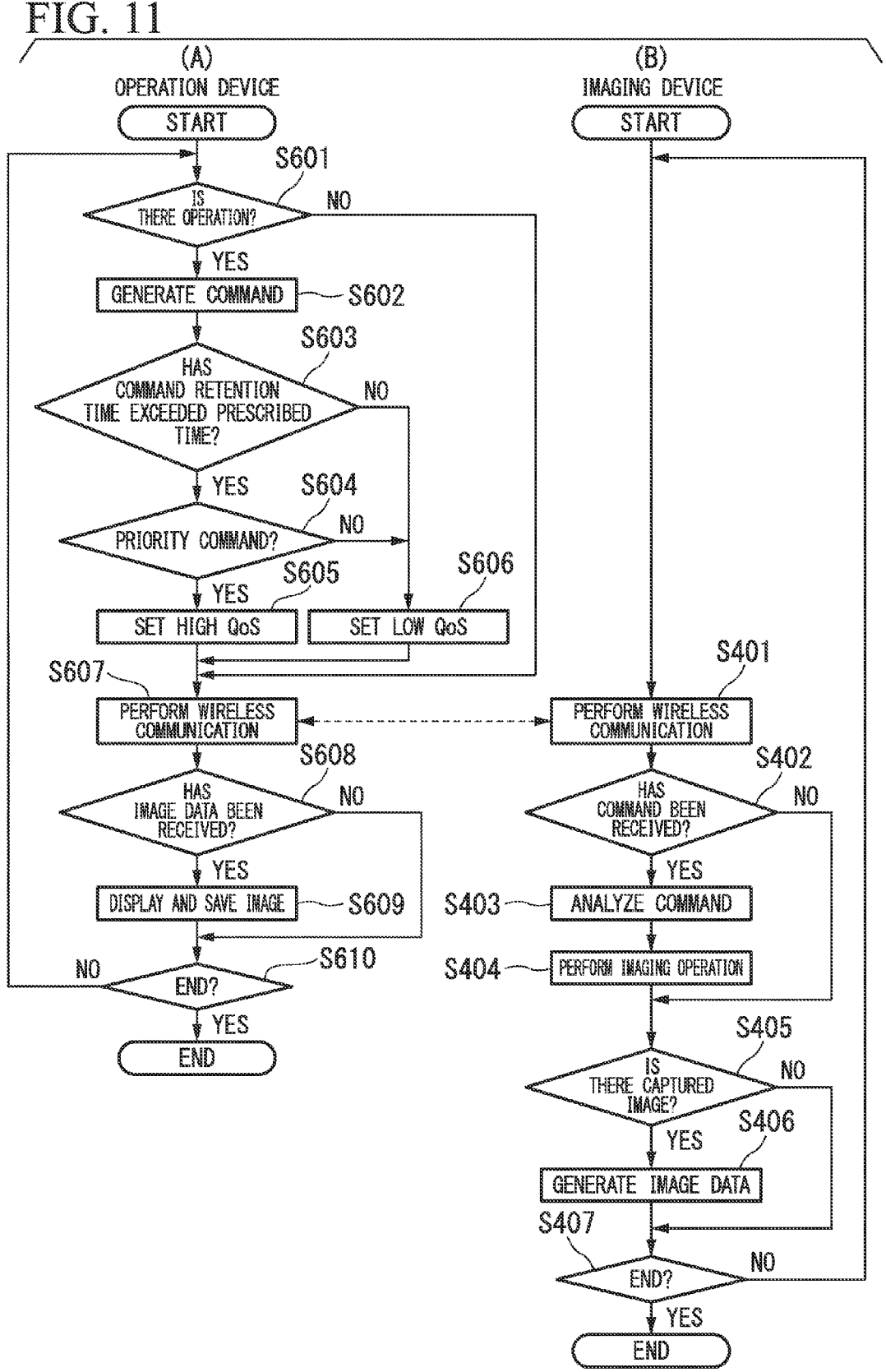
FIG. 11 is a flowchart illustrating operation procedures of the operation device and an imaging device according to the fourth embodiment of the present invention.

Next, operation procedures of the operation device 50 and the imaging device 20 will be described. FIG. 11 is a flowchart illustrating the operation procedures of the operation device 50 and the imaging device 20 in this embodiment.

First, the operation procedure of the operation device 50 will be described. In FIG. 11, (A) is a flowchart illustrating the operation procedure of the operation device 50. The process of steps S601 and S602 is similar to the process of steps S301 and S302 in the second embodiment.

(Step S603) The command retention time monitoring unit 51 executes a command retention time monitoring step. In the command retention time monitoring step, the command retention time monitoring unit 51 measures a command retention time and determines whether the measured time has exceeded a predetermined time. The command retention time monitoring unit 51 outputs retention time-out information to the QoS setting unit 13 upon determining that the retention time of the priority command has exceeded the predetermined time, and the process proceeds to step S604. Otherwise, the process proceeds to step S606.

The process of steps S604 to S610 is similar to the process of steps S303 to S309 in the second embodiment.

Next, the operation procedure of the imaging device 20 will be described. In FIG. 11, (B) is a flowchart illustrating the operation procedure of the imaging device 20. The operation procedure of the imaging device 20 in this embodiment is similar to the operation procedure of the imaging device 20 in the second embodiment.

As described above, according to this embodiment, the command retention time monitoring unit 51 of the operation device 50 determines whether the retention time of the priority command has exceeded the predetermined time. The QoS setting unit 13 of the operation device 50 sets the QoS to a higher value than the QoS of image data for the priority command having a retention time exceeding the predetermined time. Therefore, even when the command is transmitted from the operation device 50 to the imaging device 20 using wireless communication, it is possible to perform continuous imaging at a desired speed by setting the threshold value of the command retention time in a cycle necessary for the continuous imaging.

(Fifth Embodiment)

Next, the fifth embodiment of the present invention will be described with reference to the drawings. A remote imaging system in this embodiment includes a wireless sensing device and a data collection device as in the second embodiment. A difference between this embodiment and the second embodiment is a configuration of an operation device. A configuration of an imaging device in this embodiment is similar to the configuration of the imaging device 20 in the second embodiment.

Figure 12:
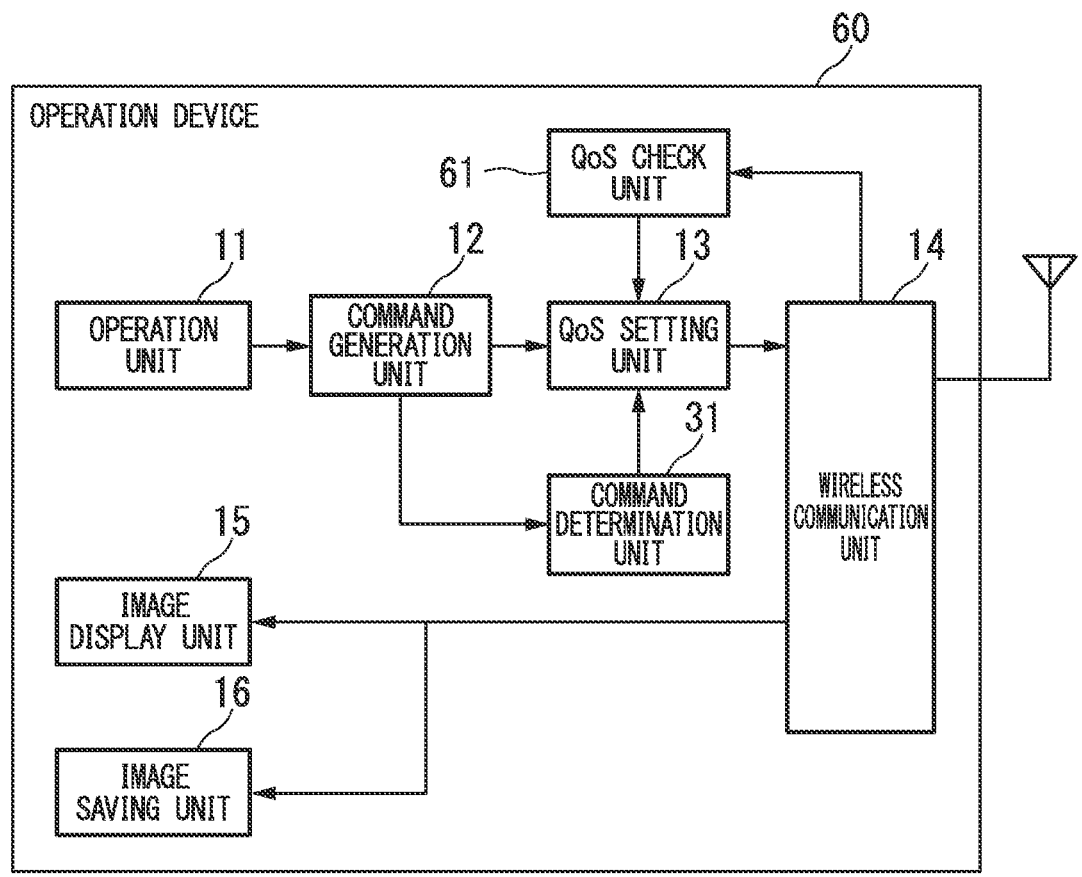
FIG. 12 is a block diagram illustrating a configuration of an operation device according to a fifth embodiment of the present invention.

FIG. 12 is a block diagram illustrating the configuration of the operation device 60 in this embodiment. In the illustrated example according to the FIG. 12, the operation device 60 includes an operation unit 11, a command generation unit 12, a QoS setting unit 13, a wireless communication unit 14, an image display unit 15, an image saving unit 16, a command determination unit 31, and a QoS check unit 61. The operation unit 11, the command generation unit 12, the QoS setting unit 13, the wireless communication unit 14, the image display unit 15, the image saving unit 16, and the command determination unit 31 are similar to the respective units in the first embodiment.

Every time the wireless communication unit 14 receives the image data, the QoS check unit 61 acquires the QoS of the image data. When the acquired QoS of the image data is updated, the QoS check unit 61 outputs QoS information after the update to the QoS setting unit 13. Before the QoS information is received from the QoS check unit 61, the QoS setting unit 13 sets a QoS initial value as QoS of the image data. In addition, when the QoS information has been input from the QoS check unit 61, the QoS setting unit 13 updates the QoS value of the image data to the input QoS.

Figure 13:
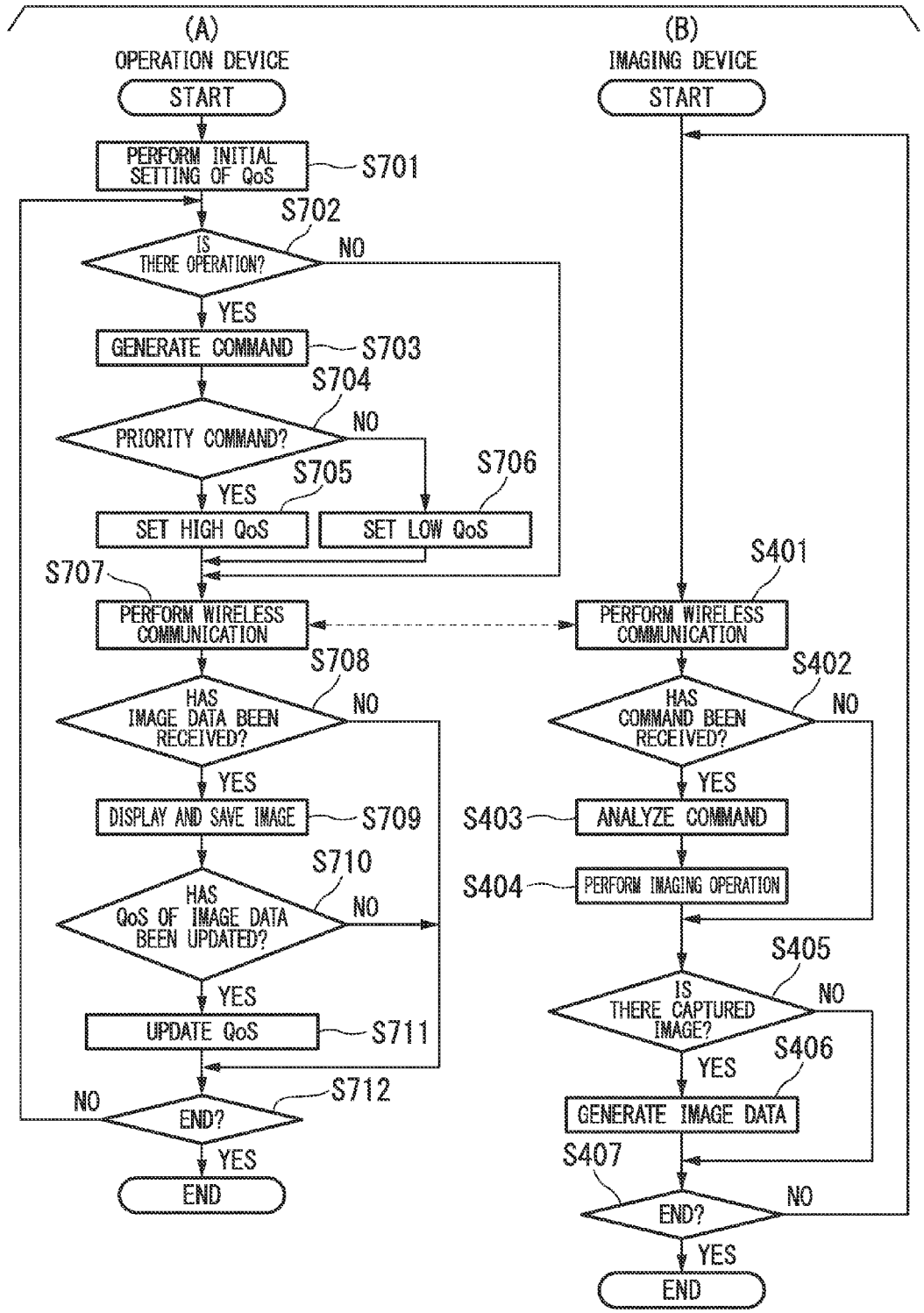
FIG. 13 is a flowchart illustrating operation procedures of the operation device and an imaging device according to the fifth embodiment of the present invention.

Next, operation procedures of the operation device 60 and the imaging device 20 will be described. FIG. 13 is a flowchart illustrating the operation procedures of the operation device 60 and the imaging device 20 in this embodiment.

First, the operation procedure of the operation device 60 will be described. In FIG. 13, (A) is a flowchart illustrating the operation procedure of the operation device 60.

(Step S701) The QoS setting unit 13 executes a QoS initial value setting step. In the QoS initial value setting step, the QoS setting unit 13 sets the QoS of the image data serving as a standard of QoS set in the priority command or the normal command to an initial value. Thereafter, the process proceeds to the process of step S702. The initial value may be a predetermined value and may be set by maintaining a value at the time of a previous operation.

The process of steps S702 to S709 is similar to the process of steps S301 to S308 in the second embodiment.

(Step S710) The QoS check unit 61 executes a QoS update determination step. In the QoS update determination step, the QoS check unit 61 determines whether the QoS of the image data has been updated by acquiring the QoS of the image data received by the wireless communication unit 14. When the QoS check unit 61 determines that the QoS of the image data has been updated, the process proceeds to step S711. Otherwise, the process proceeds to step S712.

(Step S711) The QoS setting unit 13 executes a QoS update step. In the QoS update step, the QoS setting unit 13 updates the QoS of the image data to QoS specified by QoS information input from the QoS check unit 61 in the process of step S710. Thereafter, the process proceeds to step S712.

(Step S712) The operation unit 11 executes an end determination step. In the end determination step, the operation unit 11 determines whether an input of a switch operation such as power-supply OFF has been received. When the operation unit 11 determines that the input of the switch operation such as the power-supply OFF has been received, the process ends. Otherwise, the process returns to step S702.

Next, the operation procedure of the imaging device 20 will be described. In FIG. 13, (B) is a flowchart illustrating the operation procedure of the imaging device 20. The operation procedure of the imaging device 20 in this embodiment is similar to that of the imaging device 20 in the second embodiment.

As described above, according to this embodiment, the QoS check unit 61 of the operation device 60 acquires QoS of image data transmitted from the imaging device 20 and determines whether the QoS of the image data has been updated. When the QoS of the image data transmitted from the imaging device 20 has been updated, the QoS setting unit 13 updates the QoS of the image data which is a standard of the QoS set in the priority command or the normal command. Accordingly, even when the command is transmitted from the operation device 60 to the imaging device 20 using wireless communication, it is possible to perform continuous imaging at a desired speed even when the QoS of the image data transmitted from the imaging device 20 varies for any reason.

(Sixth Embodiment)

Next, the sixth embodiment of the present invention will be described with reference to the drawings. A remote imaging system in this embodiment includes a wireless sensing device and a data collection device as in the second embodiment. A difference between this embodiment and the second embodiment is a configuration of an operation device. A configuration of an imaging device in this embodiment is similar to the configuration of the imaging device 20 of the second embodiment.

Figure 14:
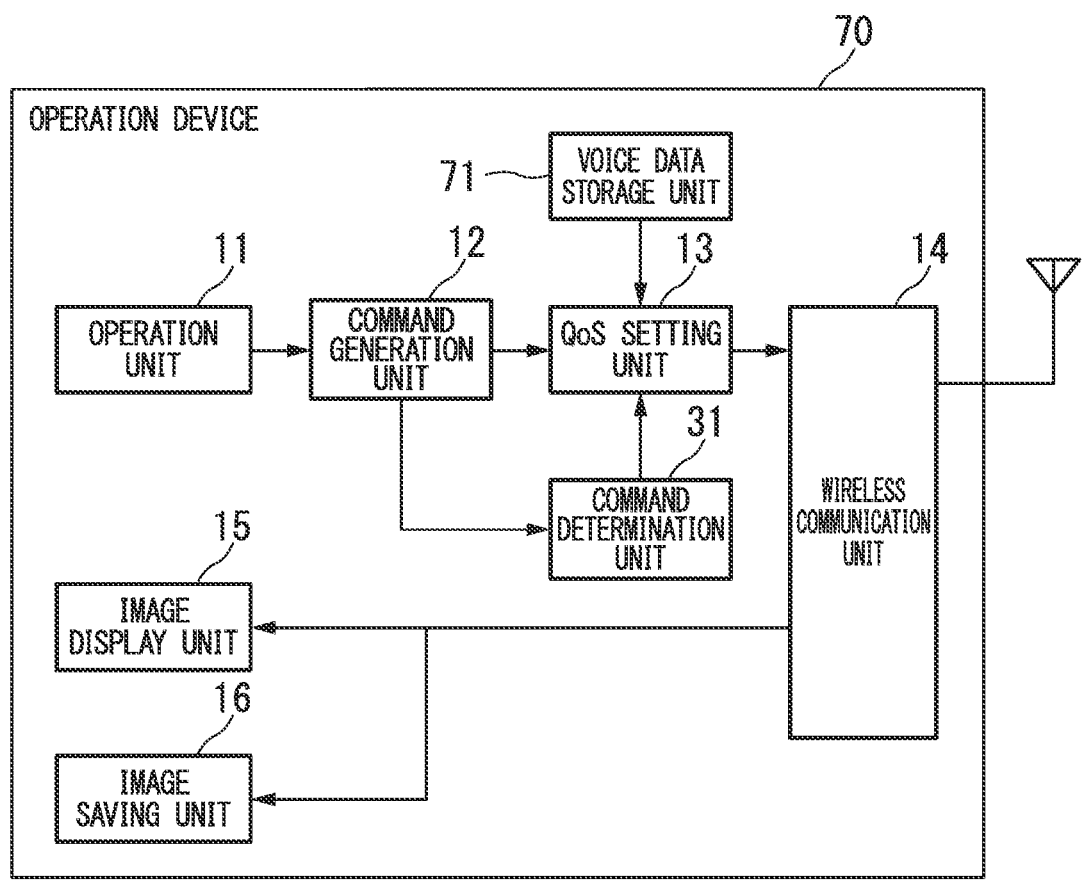
FIG. 14 is a block diagram illustrating a configuration of an operation device according to a sixth embodiment of the present invention.

FIG. 14 is a block diagram illustrating the configuration of the operation device 70 in this embodiment. In the illustrated example according to the FIG. 14, the operation device 70 includes an operation unit 11, a command generation unit 12, a QoS setting unit 13, a wireless communication unit 14, an image display unit 15, an image saving unit 16, a command determination unit 31, and a voice data storage unit 71. The operation unit 11, the command generation unit 12, the QoS setting unit 13, the wireless communication unit 14, the image display unit 15, the image saving unit 16, and the command determination unit 31 are similar to the respective units in the second embodiment.

The voice data storage unit 71 stores voice data (VoIP data, Voice over Internet Protocol data) corresponding to the priority command in advance, and outputs the voice data (VoIP data) to the QoS setting unit 13. The QoS of the voice data is higher than the QoS of the image data. The voice data storage unit 71, for example, may store a prepared shutter sound as voice corresponding to the shutter command and store voice data of a user recorded in advance.

The QoS setting unit 13 treats the operation command which is determined to be the priority command by the command determination unit 31 as the priority command among operation commands input from the command generation unit 12, and treats other operation commands as normal operation commands. When the priority command has been input, the QoS setting unit 13 acquires voice data corresponding to the priority command from the voice data storage unit 71. The QoS setting unit 13 outputs the acquired voice data to the wireless communication unit 14 in place of the priority command.

Figure 15:
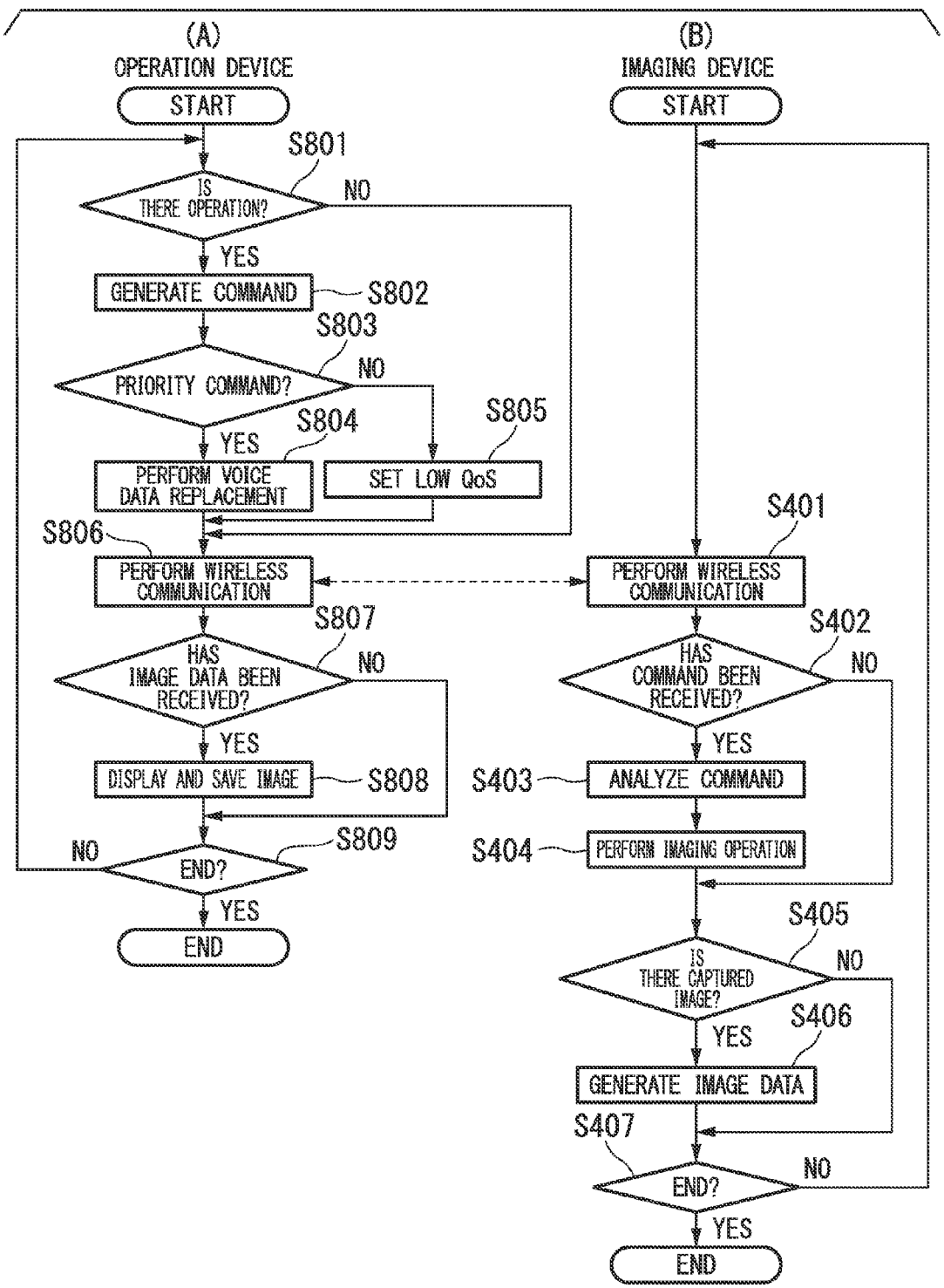
FIG. 15 is a flowchart illustrating operation procedures of the operation device and an imaging device according to the sixth embodiment of the present invention.

Next, operation procedures of the operation device 70 and the imaging device 20 will be described. FIG. 15 is a flowchart illustrating the operation procedures of the operation device 70 and the imaging device 20 in this embodiment.

First, the operation procedure of the operation device 70 will be described. In FIG. 15, (A) is a flowchart illustrating the operation procedure of the operation device 70.

The process of steps S801 to S803 is similar to the process of steps S301 to S303 in the second embodiment.

(Step S804) The QoS setting unit 13 executes a voice data replacement step. In the voice data replacement step, the QoS setting unit 13 treats the operation command which is determined to be the priority command by the command determination unit 31 in the process of step S803 as the priority command, and acquires voice data corresponding to the priority command from the voice data storage unit 71. In addition, the QoS setting unit 13 outputs the acquired voice data to the wireless communication unit 14 in place of the priority command Thereafter, the process proceeds to step S806.

The process of steps S805 to S809 is similar to the process of steps S305 to S309 in the second embodiment.

Next, the operation procedure of the imaging device 20 will be described. In FIG. 15, (B) is a flowchart illustrating the operation procedure of the imaging device 20. The operation procedure of the imaging device 20 in this embodiment is similar to that of the imaging device 20 in the second embodiment.

As described above, according to this embodiment, the voice data storage unit 71 of the operation device 70 stores voice data corresponding to a priority command in advance. When the priority command has been input, the QoS setting unit 13 acquires the voice data corresponding to the priority command from the voice data storage unit 71. The QoS setting unit 13 outputs the acquired voice data to the wireless communication unit 14 in place of the priority command. Because the voice data generally has higher QoS than the image data, a process of separately setting high QoS for transmission before the image data is unnecessary.

A constraint condition is provided regarding a data size so that the voice data is not divided into a plurality of packets. For example, by setting the data size to 1200 bytes or less and transmitting the voice data within one packet, it is possible to minimize the influence thereof on reception of image data.

Therefore, the operation device 70 can preferentially transmit voice data corresponding to the priority command to the imaging device 20 even when the imaging device 20 has image data to be transmitted to the operation device 70. Thereby, even when the command is transmitted from the operation device 70 to the imaging device 20 using wireless communication, it is possible to perform continuous imaging at high speed.

(Seventh Embodiment)

Figure 16:
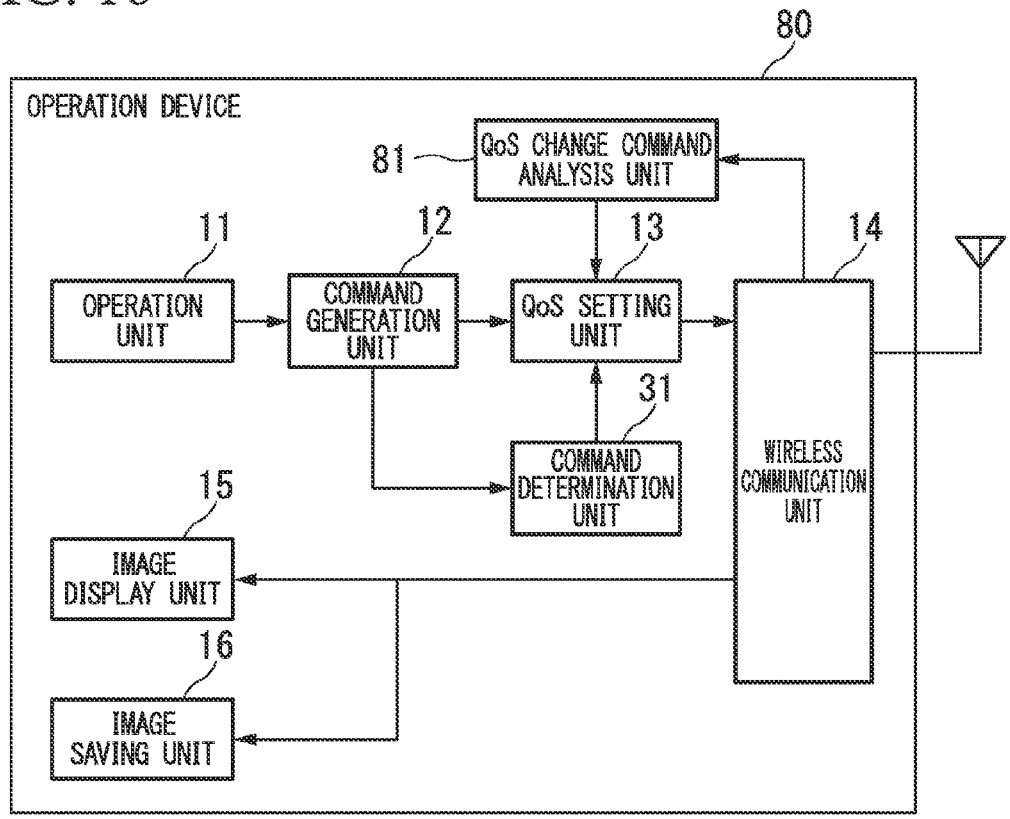
FIG. 16 is a block diagram illustrating a configuration of an operation device according to a seventh embodiment of the present invention.

Next, the seventh embodiment of the present invention will be described with reference to the drawings. A remote imaging system in this embodiment includes a wireless sensing device and a data collection device as in the second embodiment. FIG. 16 is a block diagram illustrating a configuration of an operation device 80 in this embodiment. In the illustrated example according to the FIG. 16, the operation device 80 includes an operation unit 11, a command generation unit 12, a QoS setting unit 13, a wireless communication unit 14, an image display unit 15, an image saving unit 16, a command determination unit 31, and a QoS change command analysis unit 81. The operation unit 11, the command generation unit 12, the QoS setting unit 13, the wireless communication unit 14, the image display unit 15, the image saving unit 16, and the command determination unit 31 are similar to the respective units in the second embodiment.

The QoS change command analysis unit 81 analyzes a QoS command received from the imaging device and outputs a QoS change instruction to the QoS setting unit 13. The QoS setting unit 13 changes QoS set in the priority command according to the QoS change instruction input from the QoS change command analysis unit 81. The QoS setting unit 13, for example, changes the QoS to be set in the priority command using a high QoS flag. Specifically, when the high QoS flag is ON, the QoS setting unit 13 sets the QoS included in the priority command to a QoS which is higher than the QoS of the image data. In addition, when the high QoS flag is OFF, the QoS setting unit 13 sets the QoS included in the priority command to a QoS which is equal to or lower than the QoS of the image data.

Figure 17:
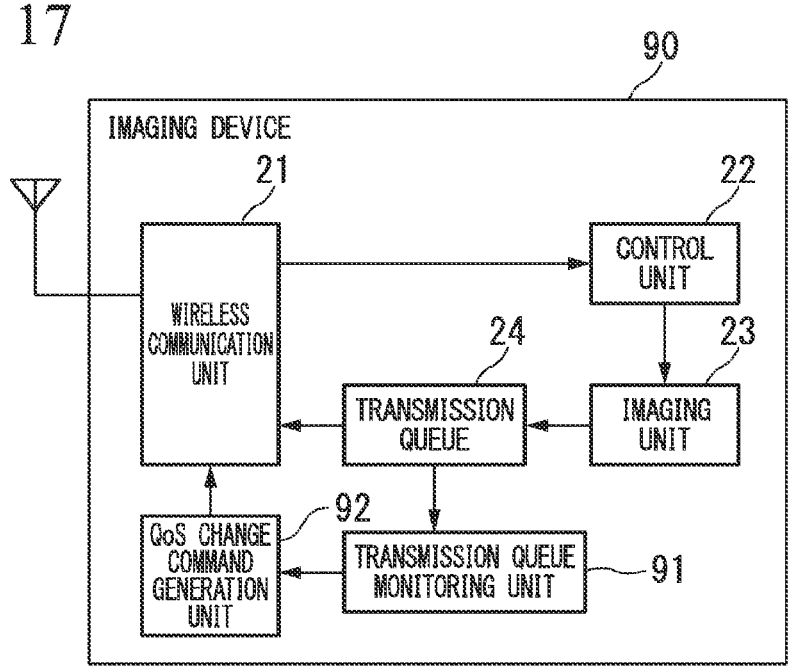
FIG. 17 is a block diagram illustrating an imaging device according to the seventh embodiment of the present invention.

FIG. 17 is a block diagram illustrating a configuration of an imaging device 90 in this embodiment. In the illustrated example according to the FIG. 17, the imaging device 90 includes a wireless communication unit 21, a control unit 22, an imaging unit 23, a transmission queue 24, a transmission queue monitoring unit 91, and a QoS change command generation unit 92. The wireless communication unit 21, the control unit 22, the imaging unit 23, and the transmission queue 24 are similar to the respective units in the second embodiment.

The transmission queue monitoring unit 91 monitors image data temporarily saved in the transmission queue 24, and outputs transmission queue use rate information to the QoS change command generation unit 92 when the image data has reached a predetermined transmission queue size or more. When the input transmission queue use rate is greater than or equal to a predetermined threshold value, the QoS change command generation unit 92 generates a QoS change (UP) command to change the QoS of the priority command to a QoS which is higher than the QoS of the image data and outputs the QoS change (UP) command to the wireless communication unit 21. On the other hand, when the input transmission queue use rate is less than the predetermined threshold value, the QoS change command generation unit 92 generates a QoS change (DOWN) command used to change the QoS of the priority command to a QoS which is equal to or lower than the QoS of the image data and outputs the QoS change (DOWN) command to the wireless communication unit 21. The wireless communication unit 21 transmits the QoS change command to the operation device 80 along with the image data.

Figure 18:
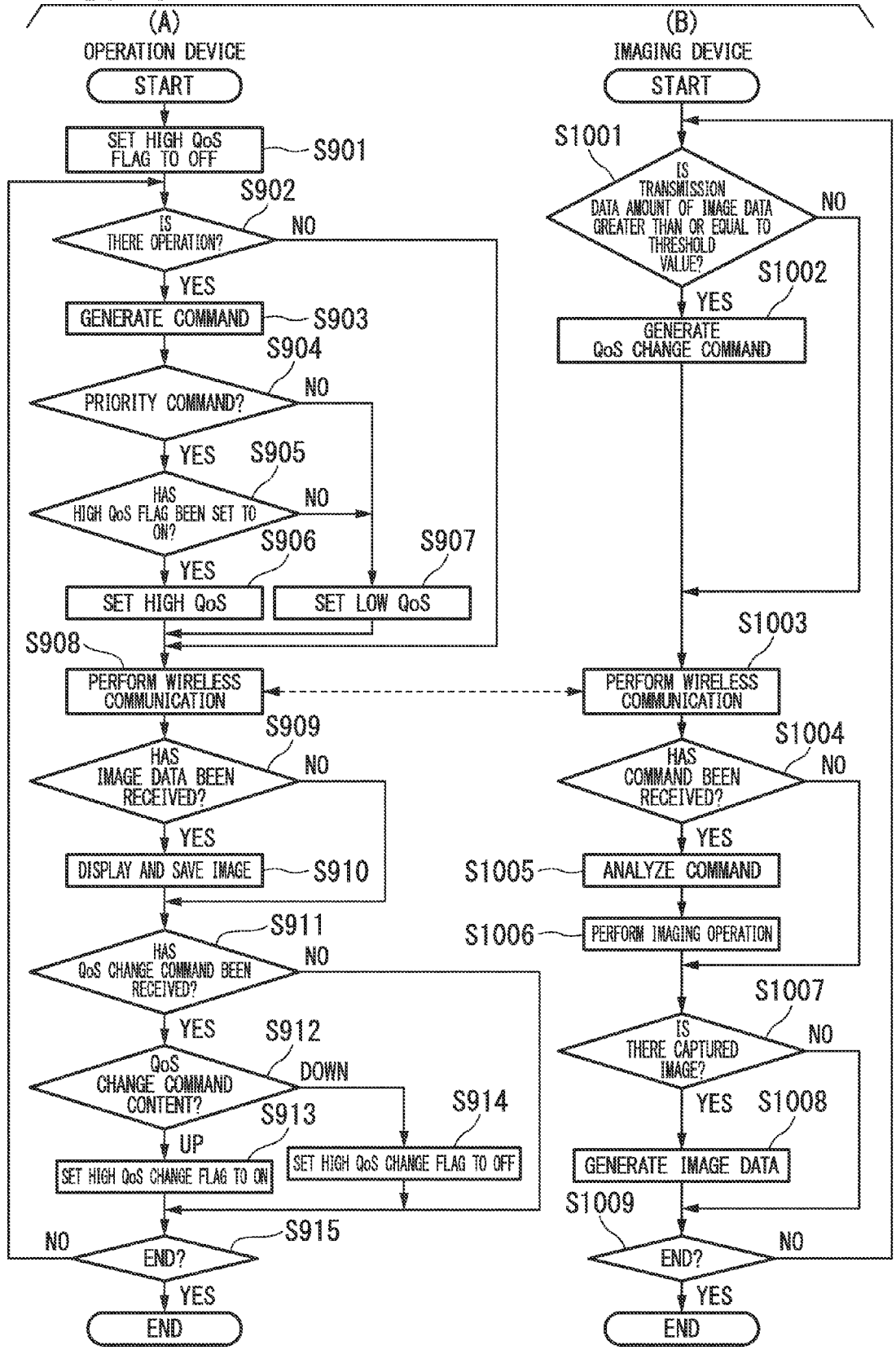
FIG. 18 is a flowchart illustrating operation procedures of the operation device an the imaging device according to the seventh embodiment of the present invention.

Next, operation procedures of the operation device 80 and the imaging device 90 will be described. FIG. 18 is a flowchart illustrating the operation procedures of the operation device 80 and the imaging device 90 in this embodiment.

First, the operation procedure of the operation device 80 will be described. In FIG. 18, (A) is a flowchart illustrating the operation procedure of the operation device 80.

(Step S901) The QoS setting unit 13 executes a high QoS flag initial value OFF setting step. In the high QoS flag initial value OFF setting step, the QoS setting unit 13 sets OFF as an initial value of a high QoS flag. Thereafter, the process proceeds to step S902.

The process of steps S902 to S904 is similar to the process of steps S301 to S303 in the second embodiment.

(Step S905) The QoS setting unit 13 executes a high QoS flag determination step. In the high QoS flag determination step, the QoS setting unit 13 determines whether the high QoS flag is ON. When the QoS setting unit 13 determines that the high QoS flag is ON, the process proceeds to step S906. When the QoS setting unit 13 determines that the high QoS flag is OFF, the process proceeds to step S907.

The process of steps S906 to S910 is similar to the process of steps S304 to S308 in the second embodiment.

(Step S911) The QoS change command analysis unit 81 executes a QoS change command reception determination step. In the QoS change command reception determination step, the QoS change command analysis unit 81 determines whether the QoS change command has been received from the imaging device 90. When the QoS change command analysis unit 81 determines that the QoS change command has been received, the operation device 80 proceeds to the process of step S912. Otherwise, the operation device 80 proceeds to the process of step S915.

(Step S912) The QoS change command analysis unit 81 executes a QoS change command content determination step. In the QoS change command content determination step, the QoS change command analysis unit 81 determines content of the QoS change command. When the QoS change command analysis unit 81 determines that the QoS change command is the QoS change (UP) command, the process proceeds to step S913. On the other hand, when the QoS change command analysis unit 81 determines that the QoS change command is the QoS change (DOWN) command, the process proceeds to step S914.

(Step S913) The QoS setting unit 13 executes a high QoS flag ON step. In the high QoS flag ON step, the QoS setting unit 13 sets the high QoS flag to ON. Thereafter, the process proceeds to step S915.

(Step S914) The QoS setting unit 13 executes a high QoS flag OFF step. In the high QoS flag OFF step, the QoS setting unit 13 sets the high QoS flag to OFF. Thereafter, the process proceeds to step S915.

(Step S915) The operation unit 11 executes an end determination step. In the end determination step, the operation unit 11 determines whether an input of a switch operation such as power-supply OFF has been received. When the operation unit 11 determines that the input of the switch operation such as the power-supply OFF has been received, the process ends. Otherwise, the process returns to step S902.

Next, an operation procedure of the imaging device 90 will be described. In FIG. 18, (B) is a flowchart illustrating the operation procedure of the imaging device 90.

(Step S1001) The transmission queue monitoring unit 91 executes a transmission queue determination step. In the transmission queue determination step, the transmission queue monitoring unit 91 monitors image data temporarily saved in the transmission queue 24, and determines whether the image data has reached the predetermined transmission queue size or more. When the transmission queue monitoring unit 91 determines that the image data saved in the transmission queue 24 has reached the predetermined transmission queue size or more, transmission queue use rate information is output to the QoS change command generation unit 92. In this case, the process proceeds to step S1002. On the other hand, when the transmission queue monitoring unit 91 determines that the image data saved in the transmission queue 24 has not reached the predetermined transmission queue size or more, the process proceeds to step S1003.

(Step S1002) The QoS change command generation unit 92 executes a QoS change command generation step. In the QoS change command generation step, the QoS change command generation unit 92 determines whether the transmission queue use rate is greater than or equal to the predetermined threshold value based on the input transmission queue use rate information. Upon determining that the transmission queue use rate is greater than or equal to the predetermined threshold value, the QoS change command generation unit 92 generates the QoS change (DOWN) command for changing the QoS at the time of transmission of the priority command to QoS which is equal to or lower than the QoS of the image data, and outputs the QoS change (DOWN) command to the wireless communication unit 21. On the other hand, upon determining that the transmission queue use rate is not greater than or equal to the predetermined threshold value, the QoS change command generation unit 92 generates the QoS change (UP) command for changing the QoS at the time of transmission of the priority command to a QoS which is higher than the QoS of the image data, and outputs the QoS change (UP) command to the wireless communication unit 21. Thereafter, the process proceeds to step S1003.

(Step S1003) The wireless communication unit 21 executes a wireless communication step. In the wireless communication step, the wireless communication unit 21 performs a reception process of the priority command or the normal command transmitted from the operation device 80 or a transmission process of the image data for the operation device 80 based on QoS set in the priority command or the normal command. Thereafter, the process proceeds to step S1004. When the QoS change (UP) command or the QoS change (DOWN) command has been input in the process of step S1002, the wireless communication unit 21 performs the transmission process of the QoS change (UP) command or the QoS change (DOWN) command along with the image data. In addition, when there is no priority command or normal command which is transmitted and there is no image data which is received, the process proceeds to step S1004.

The process of steps S1004 to S1009 is similar to the process of steps S402 to S407 in the second embodiment.

As described above, according to this embodiment, the imaging device 90 transmits the QoS change (DOWN) command to the operation device 80 when the transmission queue 24 of the imaging device 90 is full with the temporarily stored image data and the transmission queue use rate is greater than or equal to the predetermined threshold value. Thereby, it is possible to relatively increase QoS of the image data to be transmitted from the imaging device 90 to the operation device 80. Accordingly, because it is possible to reduce a transmission queue even when the transmission queue of the queue 24 of the imaging device 90 is increased when the command is transmitted from the operation device 80 to the imaging device 90 using wireless communication, it is possible to perform continuous imaging at a continuous high speed.

Although the first to seventh embodiments of the present invention have been described above with reference to the drawings, specific configurations are not limited to the embodiments, and a design change, and so on may also be included without departing from the scope of the present invention.

Also, all or some of the functions of the units provided in the operation device and the imaging device in the above-described first to seventh embodiments may be implemented by recording a program for implementing the functions on a computer-readable recording medium and causing a computer system to read and execute the program recorded on the recording medium. Also, the "computer system" described here includes an operating system (OS) and hardware such as peripheral devices.

In addition, the "computer-readable recording medium" refers to a storage device including a flexible disk, a magneto-optical disc, a read only memory (ROM), a portable medium such as a compact disc ROM (CD-ROM), and a hard disk embedded in the computer system. Further, the "computer-readable recording medium" is a medium for dynamically holding a program for a short time as in a communication line when the program is transmitted via a network such as the Internet or a communication circuit such as a telephone circuit. In this case, the "computer-readable recording medium" may also include a medium for holding the program for a predetermined time as in a volatile memory inside the computer system including a server and a client when the program is transmitted. In addition, the above-described program may be used to implement some of the above-described functions. Further, the program may implement the above-described functions in combination with a program already recorded on the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An operation device comprising:
    an operation unit;
    a command generator generating an operation command for an imaging device provided in the operation unit;
    a wireless communication unit to transmit the operation command to the imaging device, and receive an image data transmitted from the imaging device, based on a quality of service (QoS) representing a priority of transmission/reception;
    a QoS setter initially setting a QoS of the operation command generated by the command generator to a value which is equal to or lower than a QoS of the image data regardless of whether the operation command is a priority command, and outputting the operation command to the wireless communication unit; and
    a retention time monitor monitoring whether a time in which the priority command is retained in the operation device is greater than or equal to a predetermined time; wherein
    the QoS setter sets the QoS of the priority command to a value which is higher than the QoS of the image data when the time in which the priority command is retained in the operation device is greater than or equal to the predetermined time.

2. The operation device according to claim 1, further comprising:
    a command determinator determining whether the operation command generated by the command generator is the priority command having the higher transmission priority than the image data received by the wireless communication unit.

3. The operation device according to claim 1, further comprising:
    a monitoring unit to monitor a buffer state of data to be wirelessly communicated by the wireless communication unit,
    wherein the QoS setter determines whether to set the QoS of the priority command to a value which is higher than the QoS of the image data based on the buffer state monitored by the monitoring unit.

4. The operation device according to claim 3,
    wherein the monitoring unit monitors whether the image data from the imaging device is being received based on the buffer state, and
    the QoS setter sets the QoS of the priority command to a value which is higher than the QoS of the image data when a reception of the image data has not ended.

5. The operation device according to claim 4, wherein the QoS setter sets the QoS of the priority command to a value which is equal to or lower than the QoS of the image data when the reception of the image data has ended.

6. The operation device according to claim 3,
    wherein the monitoring unit monitors whether a time in which the priority command is retained in a buffer is greater than or equal to a predetermined time, and
    the QoS setter sets the QoS of the priority command to a value which is higher than the QoS of the image data when the time in which the priority command is retained in the buffer is greater than or equal to the predetermined time.

7. The operation device according to claim 1, further comprising:
    a QoS check unit to check the QoS of the image data,
    wherein the QoS setter sets the QoS of the priority command to a value which is higher than the QoS of the image data checked by the QoS check unit.

8. The operation device according to claim 1, further comprising:
    a data storage unit to store a high QoS data defined in a protocol used by the wireless communication unit and the high QoS data has a higher QoS than the image data,
    wherein the QoS setting unit sets the high QoS data corresponding to the priority command to a value, and
    the wireless communication unit transmits the high QoS data set by the QoS setting unit.

9. The operation device according to claim 8, wherein the high QoS data is a voice data.

10. The operation device according to claim 8, wherein a data size of the high QoS data is a size of data transmittable in one packet.

11. The operation device according to claim 2,
wherein the wireless communication unit receives a QoS decrease instruction command representing an instruction to decrease the QoS of the priority command, and
the QoS setter sets the QoS of the priority command to a value which is lower than or equal to the QoS of the image data when the wireless communication unit has received the QoS decrease instruction command.

12. The operation device according to claim 11,
wherein the wireless communication unit receives a QoS decrease cancelation instruction command representing an instruction to cancel the QoS decrease instruction command, and
the QoS setter sets the QoS of the priority command to a value which is higher than the QoS of the image data when the wireless communication unit has received the QoS decrease cancelation instruction command.

13. A remote imaging system comprising:
an imaging device and an operation device configured to remotely operate the imaging device using wireless communication,
wherein the operation device comprises:
an operation unit;
a command generator generating an operation command for the imaging device;
a first wireless communication unit to transmit the operation command to the imaging device, and receive an image data transmitted from the imaging device, based on a a quality of service (QoS) representing a priority of transmission/reception; and
a QoS setter initially setting a QoS of the operation command generated by the command generator to a value which is equal to or lower than a QoS of the image data regardless of whether the operation command is a priority command, and, outputting the operation command to the first wireless communication unit; and
a retention time monitor monitoring whether a time in which the priority command is retained in the operation device is greater than or equal to a predetermined time, wherein
the QoS setter sets the QoS of the priority command to a value which is higher than the QoS of the image data when the time in which the priority command is retained in the operation device is greater than or equal to the predetermined time, and the imaging device comprises:
an imaging unit to generate the image data; and
a second wireless communication unit to transmit the image data to the operation device, and receive the operation command transmitted from the operation device, based on the QoS representing the priority of transmission/reception.

14. The remote imaging system according to claim 13,
wherein the imaging device further comprises a QoS change instruction command generation unit to generate a QoS decrease instruction command representing an instruction to decrease the QoS of the priority command predetermined with the imaging device which transmits the image data, and
the operation device further comprises a QoS change instruction command analysis unit to receive the QoS decrease instruction command from the imaging device and acquire the QoS decrease instruction command, wherein
the QoS setter sets the QoS of the priority command to a value which is equal to or lower than the QoS of the image data when the QoS change instruction command analysis unit has acquired the QoS decrease instruction.

15. The remote imaging system according to claim 14,
wherein the QoS change instruction command generation unit generates a QoS instruction cancelation command representing an instruction to cancel the QoS decrease instruction command with the imaging device which transmits the image data,
the QoS change instruction command analysis unit receives the QoS instruction cancelation command from the imaging device and acquires the QoS instruction cancelation command, and
the QoS setter sets the QoS of the priority command to a value which is higher than the QoS of the image data when the QoS change instruction command analysis unit has acquired the QoS instruction cancelation command.

* * * * *